(12) United States Patent
Shirakura et al.

(10) Patent No.: US 7,013,942 B2
(45) Date of Patent: Mar. 21, 2006

(54) APPARATUS AND METHOD FOR PRODUCING PRINT

(75) Inventors: Akira Shirakura, Tokyo (JP); Hirotsuga Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/824,166

(22) Filed: Apr. 13, 2004

(65) Prior Publication Data

US 2004/0194893 A1    Oct. 7, 2004

Related U.S. Application Data

(62) Division of application No. 10/149,723, filed as application No. PCT/JP01/09077 on Oct. 16, 2001, now Pat. No. 6,739,368.

(30) Foreign Application Priority Data

Oct. 16, 2000    (JP)    ............................ P2000-315966

(51) Int. Cl.
    *B65C 9/00*    (2006.01)
(52) U.S. Cl. ...................... 156/443; 156/556; 156/227; 156/226; 156/216; 156/521; 156/517; 156/519; 156/522; 156/256
(58) Field of Classification Search ................ 156/510, 156/512, 443, 256, 269, 517, 521, 216, 217, 156/223, 226, 196, 475, 227, 519, 522, 559, 156/563
See application file for complete search history.

(56) References Cited

U.S. PATENT DOCUMENTS

| | | | |
|---|---|---|---|
| 4,126,373 A | | 11/1978 | Moraw ...................... 350/3.61 |
| 4,675,062 A | * | 6/1987 | Instance ..................... 156/227 |
| 4,925,779 A | | 5/1990 | Policht et al. .............. 430/403 |
| 5,776,286 A | | 7/1998 | Yeh et al. ................... 156/256 |
| 5,949,559 A | | 9/1999 | Kihara et al. ................. 359/23 |
| 6,159,327 A | * | 12/2000 | Forkert ....................... 156/264 |

\* cited by examiner

*Primary Examiner*—Linda Gray
(74) *Attorney, Agent, or Firm*—Jay H. Maioli

(57) ABSTRACT

A print producing apparatus of a print producing system is provided with a recording medium conveying section which intermittently conveys a strip-like hologram recording medium, a cutting out section which cuts out, as a piece of hologram recording medium, a predetermined region of the recording medium that includes at least a piece of a holographic stereogram image or a hologram from a hologram recording medium, a film retaining section and a film supplying section which one by one provides plural sheets of protecting film PF which are retained, a film opening and closing section which opens and folds a single sheet of the PF which has been folded in two along a folding line of the PF, a mounting retaining and supplying section which one by one provides plural sheets of mountings, and a laminating section which laminates the recording medium piece for hologram and the mounting with the PF.

3 Claims, 10 Drawing Sheets

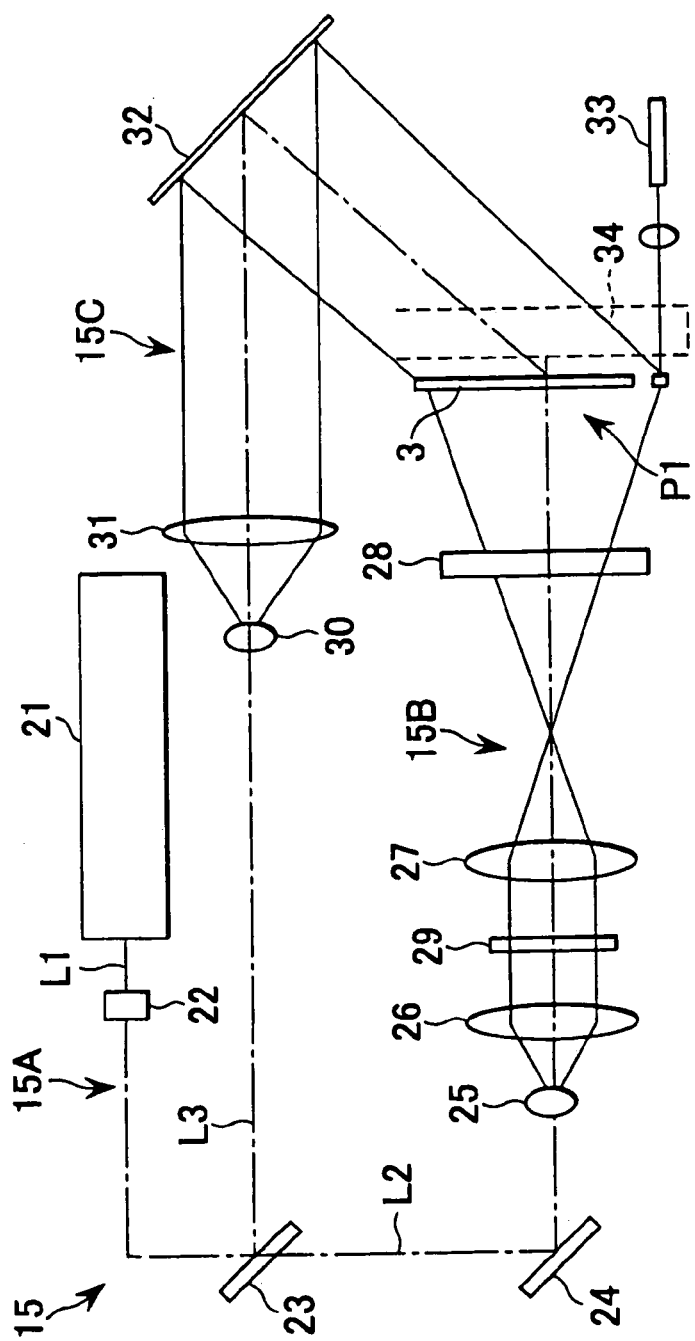
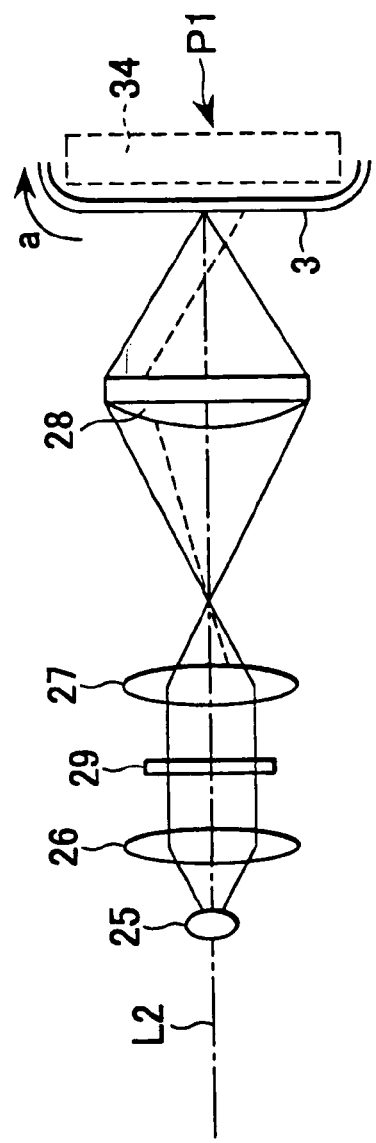
FIG.5A
FIG.5B

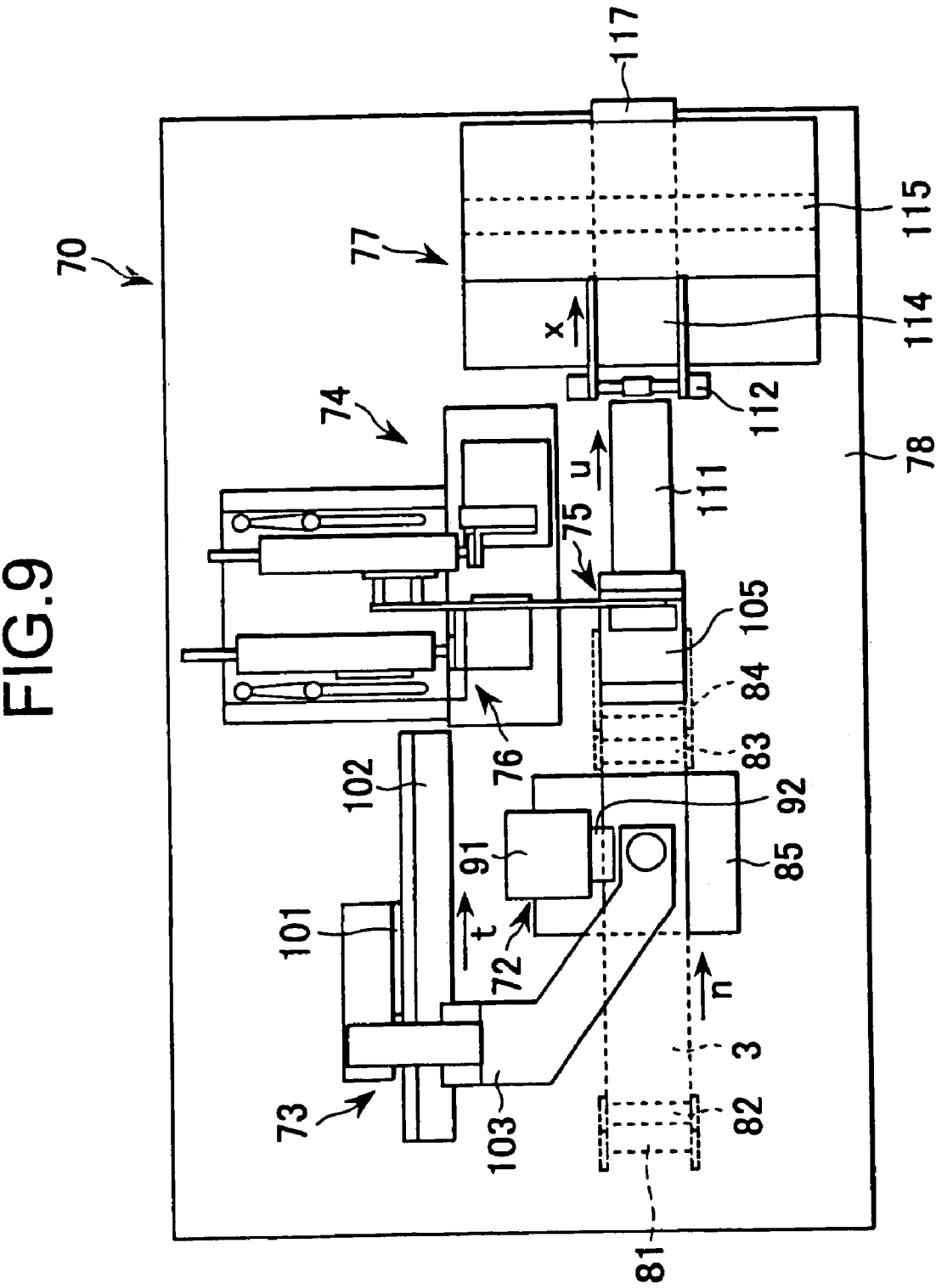

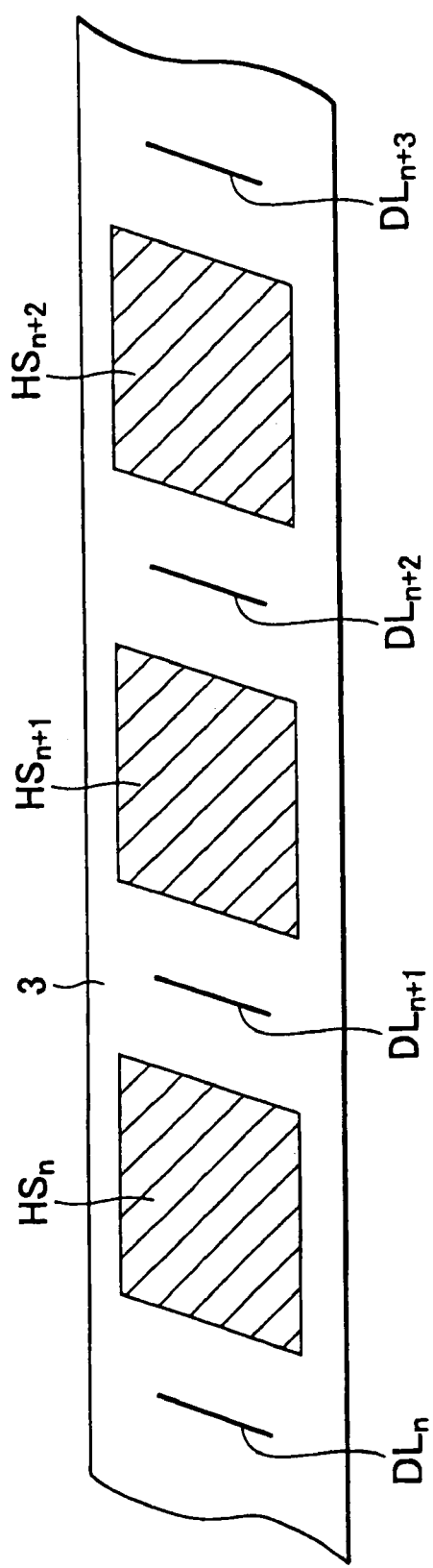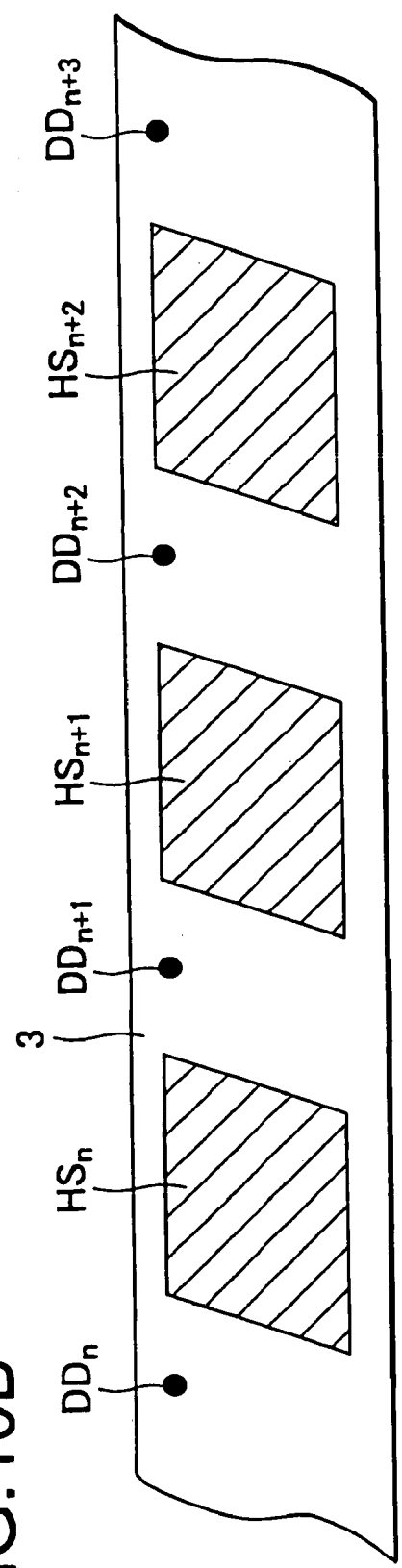

APPARATUS AND METHOD FOR PRODUCING PRINT

CROSS REFERENCE TO RELATED APPLICATIONS

This application is a division of Ser. No. 10/49,723 filed Jun. 13, 2002, now U.S. Pat. No. 6,739,368 which is a 371 of PCT/JP01/09077 filed Oct. 16, 2001.

This application claims priority to Japanese Patent Application No. JP 2000-315966, and the disclosure of that application is herein incorporated by reference to the extent permitted by law.

TECHNICAL FIELD

This invention relates to an apparatus and a method for producing a print in which a holographic stereogram image or a hologram image is exposed and recorded, an apparatus and a method for cutting out a holographic stereogram image or a hologram image, an apparatus and a method for laminating with a protecting film a hologram recording medium on which a holographic stereogram image or a hologram image is exposed and recorded to, and an apparatus and a method for sequentially exposing and recording plural holographic stereogram images or plural hologram images onto a hologram recording medium.

BACKGROUND ART

Generally, a holographic stereogram is e.g. produced with a plurality of images obtained by sequentially capturing an object image from different observation points as original images and sequentially exposing and recording each of the original images as a stripe-shaped or a dot-shaped element hologram onto a single hologram recording medium.

For example, a holographic stereogram is produced by means of a holographic stereogram producing apparatus 200 as shown in FIG. 11A. The holographic stereogram producing apparatus 200 is provided with a laser light source 201 which emits a laser light L201 in which wavelength is formed by a single mode having optimum interference characteristic, a half mirror 202 which divides the emitted laser light L201 into an object light L202 and a reference light L203, optical elements 203, 204, 205, 206, 207 and a display apparatus 208 which constitute an optical system of object light L202, optical elements 209, 210, and 211 which constitute an optical system of the reference light L203, and an electromotive stage 213 which retains or supplies a record medium designed for hologram 212 onto which the object light L202 and the reference light L203 are converged.

The optical system including the object light L202 is constituted by a total reflection mirror 203, a first cylindrical lens 204 which has the object light diffused in one-dimensional direction, a collimator lens 205 which converts the diffused object light L202 into a parallel light, a projection lens 206, and a second cylindrical lens 207 which introduces the object light L202 onto a recording medium 212 designed for hologram 212 in an exposing and recording section P201, which are arranged in order from a light incident side along an optical axle. A liquid crystal panel of transmission type, which is arranged between the collimator lens 205 and the projection lens 206, constitutes the display apparatus 208. The display apparatus 208 displays image data output from an image processing section not shown in the figure.

The optical system including the reference light L203 is constituted by a cylindrical lens 209 which has the object light diffused in one-dimensional direction, a collimator lens 210 which converts the diffused object light L203 into a parallel light, and a total reflection mirror 211 which reflects the object light L202 to introduce the reflected one to a hologram recording medium 212 in an exposing and recording section P201, which are arranged in order from a light incident side along an optical axle.

A record medium designed for hologram 212 is e.g. made of a photosensitive film and retained by an electromotive stage 213 as shown in FIG. 11B. The medium 212 designed for hologram is intermittently run in a direction of an arrow aa by drive of this electromotive stage 213.

As shown in FIG. 11A, the laser light L201 is emitted from laser light source 201 and incident on the half mirror 202. The laser light L201 is divided into the object light L202 and the reference light L203 by this half mirror 202.

The object light L202 is incident on the display apparatus 208 after traveling by way of the cylindrical lens 204 and collimator lens 205. The image is modulated, depending on an element image displayed when transmitted through this display apparatus 208. The modulated object light L202 is incident on the record medium designed for hologram 212 arranged at the exposing and recording section P201 after traveling by way of the projection lens 206 and the cylindrical lens 207. The reference light L203 is incident on the recording medium 212 designed for hologram arranged at the exposing and recording section P201, after traveling by way of an optical system of the cylindrical lens 209, the collimator lens 210 and the total reflection mirror 211.

Thus, interference fringes produced by interference between the reference light L203 and the object light L202 modulated by an image displayed by display apparatus 208 is sequentially exposed and recorded onto the hologram recording medium 212 as an element hologram in a striped or dotted manner.

The holographic stereogram produced by such holographic stereogram producing apparatus 200 is identified, with aggregate of pieces of the reference image information regarded as parts of each of element holograms, as two-dimensional image by an observer when the observer views the holographic stereogram with one of observer's both eyes from a certain position. The holographic stereogram produced thereby is identified, which is regarded aggregate of pieces of image information recorded as a part of each element hologram as the other two-dimensional image when an observer views the holographic stereogram with the other one of the observer's both eyes from any position except for the certain position. Thus, the holographic stereogram is identified, regarding an exposed and recorded image as a three-dimensional image owing to parallax effect between right and left eyes when an observer views the holographic stereogram with both his or her eyes.

An application as to such a holographic stereogram is e.g. stated in "Instant holographic portrait printing system" by Akira Shirakura, Nobuhiro Kihara and Shigeyuki Baba, in Proceeding of SPIE, Vol. 3293, pp.246–253, January 1998 and "High speed hologram portrait print system" by Kihara, Shirakura, and Baba disclosed in "Three-dimensional Image Conference 1998", July, 1998 and so on. As stated therein, there is a printer system or the like constituted by combination of a imaging apparatus/image capture apparatus which captures an image of an object and produces a parallax image sequence and a printing apparatus such as the above-mentioned holographic stereogram producing apparatus 200 which outputs a holographic stereogram or a hologram as a print. Such a system can provide a service that encompasses from capturing an image of an object to printing the captured result at the same location.

DISCLOSURE OF THE INVENTION

By the way, the above-mentioned holographic stereogram producing apparatus 200 often uses a strip-like photosensitive film as the record medium 212 designed for hologram. In this case, usually, when a single holographic stereogram is exposed and recorded onto the image record medium 212 by the holographic stereogram producing apparatus 200, the single one is cut out as a single unit and a predetermined fixation process is applied to the cut out stereogram.

However, such a method can not be efficiently performed when a print of a holographic stereogram image or a hologram image is mass-produced, thus constituting a barrier preventing the realization of a system that could meet such a demand for mass-production.

Further, when such a method is applied to a system for providing a service encompassing from imaging/image-capturing an object to printing operation of the captured result at a same location, the strip-like recording medium 212 designed for hologram 212 may have to be conveyed forwardly, bringing about more non-exposed sections in the recording medium 212 designed for the hologram 212, with a result that production yield is low.

This invention is devised in view of such a fact. It is desirable that a print producing apparatus and method are provided, in which waste of non-exposed portion in a record medium designed for a hologram can be minimized and a holographic stereogram image or a hologram image can be efficiently produced as a print.

Further, it is desirable to provide an image cutting out apparatus and an image cutting out method capable of efficiently cutting out a holographic stereogram image or a hologram image from a recoding medium designed for hologram in order to minimize waste of non-exposed section in a hologram recording medium and efficiently produce the holographic stereogram image or the hologram image as a print.

Further, it is desirable to provide an apparatus and a method capable of efficiently laminating a piece of hologram recording medium in which a holographic stereogram image or a hologram image is exposed and recorded with a protecting film in order to minimize waste of a non-exposed portion in a hologram recording medium and efficiently produce the holographic stereogram image or the hologram image as a print.

Further, it is desirable to provide an apparatus and a method for recording an image capable of sequentially exposing and recording plural holographic stereogram images or hologram images onto a hologram recording medium, eliminating wastage of a non-exposed portion in the hologram recording medium, resulting in efficiently producing a holographic stereogram image or a hologram image as a print.

A desirable print producing apparatus of one preferred embodiment of the present invention is characterizing by the following. The print producing apparatus for producing a print in which a holographic stereogram image or a hologram image is exposed and recorded includes: a recording medium conveying member for intermittently conveying a strip-like hologram recording medium in which plural holographic stereogram images or hologram images are exposed and recorded, a cutting out member for cutting out a portion having a predetermined size at least including the holographic stereogram images or the hologram images exposed and recorded from the hologram recording medium intermittently conveyed by the recording medium conveying member, a positioning member for deciding a position where a piece of the recoding medium designed for the hologram MD is cut out by the cutting out member, a film retaining member for retaining plural pieces of protecting (plastic) film for protecting both sides of the piece of the hologram recording medium MD, a film supplying member for supplying a single piece from among the plural pieces of the protecting (plastic) film retained by the film retaining member while the single piece is folded in two along a folding line, a film opening and closing member for opening and closing the single piece of the protecting plastic film folded in two by the film supplying member fed to the predetermined position and heating and pressure-bonding member for heating and pressure-bonding the piece thereof folded into an original status manner along the folding line by the film opening and closing member such that the hologram recording medium is at least sandwiched by the protecting film.

The print producing apparatus of one preferred embodiment like this cuts out a piece of hologram recording medium by means of a cutting out member, sandwiches the piece with a protecting film, and laminates the sandwiched piece by means of a heating and pressure-bonding member.

A desirable print producing method of one preferred embodiment of the present invention is characterized by the following. The method is directed to a print producing method for producing a print in which a holographic stereogram image or a hologram image is exposed and recorded including the following steps of: intermittently conveying a strip-like hologram recording medium in which plural holographic stereogram images or hologram images are exposed and recorded, positioning and cutting out a portion/region/portion having a predetermined size and including the holographic stereogram images or the hologram images exposed and recorded from the hologram recording medium intermittently conveyed, supplying a single piece from among the plural pieces of the protecting plastic film for both protecting sides while the single piece is folded in two, opening and closing the single piece of the protecting plastic film folded in two by the film supplying means fed to the predetermined position, and heating and pressure-bonding the piece thereof folded into an original status along the folding line by the film opening and closing means in such a way that at least the hologram recording medium is sandwiched by the protecting (plastic) film.

The print producing method of such preferred embodiment cuts out a piece of hologram recording medium by means of a culling out member, sandwiches the piece with a protecting plastic film, and laminates the sandwiched piece by means of a heating and pressure-bonding member.

In addition, a desired image cutting out apparatus of one preferred embodiment of the present invention is characterized by the following. The apparatus is directed to an image cutting out apparatus including: a recording medium conveying member for intermittently conveying a strip-like hologram recording medium in which plural holographic holographic stereogram images or hologram images are exposed and recorded, a cutting out member for cutting out a portion having a predetermined size including at least the plural holographic holographic stereogram images or hologram images exposed and recorded from the hologram recording medium intermittently fed by the recording medium conveying member, and a positioning member for deciding a position where a piece of the recording medium is cut out from the hologram recording medium by the cutting out member.

Such cutting out apparatus of the preferred embodiment of the present invention positions an region having a predetermined area including at least the hologram stereogram image or the hologram image by means of the positioning member and cuts out the concerning region as a piece of hologram recording medium by means of the cutting out member.

Further, a desired method of cutting out an image of one preferred embodiment of the present invention is characterizing by the following. The method is directed to an image cutting out method including the steps of intermittently conveying a strip-like hologram recording medium in which plural holographic stereogram images or hologram images are exposed and recorded, and positioning and cutting out a region having a predetermined size and including at least the holographic stereogram images or hologram images exposed and recorded from the hologram recording medium to be intermittently conveyed.

Further, a desired laminating apparatus of one preferred embodiment of the present invention is characterizing by including the steps of positioning a predetermined area including at least the hologram stereogram image or the hologram image by means of the positioning member and cuts out the region as a piece of hologram recording medium by means of the cutting out member.

A laminating apparatus of one preferred embodiment of the present invention to attain the above-mentioned aim is characterized by the following. The laminating apparatus for laminating a piece of a hologram recording medium in which a holographic stereogram image or a hologram image is exposed and recorded with a protecting film for protecting both sides of the film includes film retaining member for retaining plural pieces of the protecting film, film supplying member for supplying one by one and folded in two the plural pieces of the protecting film retained by the film retaining member to a predetermined position of the film, film opening and closing member for opening, along a folding line, a single sheet of the protecting film provided at the predetermined position folded in two along a folding line, and heat and pressure-bonding member for heating and pressure-bonding the protecting film folded along the folding line into an original status by the film opening and closing member in such a way that at least the hologram recording medium is sandwiched by the protecting film.

The laminating apparatus of one preferred embodiment like this sandwiches the piece with a protecting film, and laminates the sandwiched piece by means of a heating and pressure-bonding member.

A desired laminating method of one preferred embodiment of the present invention is characterized by the following. The laminating method for laminating a piece of a hologram recording medium in which a holographic stereogram image or a hologram image is exposed and recorded with a protecting film for protecting both sides of the film includes the following steps of: supplying the plural pieces of the protecting film retained by the film retaining member one by one and folded in two to a predetermined position of the protecting film, opening a single sheet of the protecting film one by one provided at the predetermined position in folding-in-one manner of the film along a folding line and folding the single sheet thereof, and heating and pressure-bonding the protecting film folded along the folding line into an original status by the film opening and closing member in such a way that the hologram recording medium is at least sandwiched by the protecting film.

Such laminating method of the preferred embodiment of the present invention sandwiches the piece with a protecting film, and laminates the sandwiched piece by means of a heating and pressure-bonding member. Further, an image recording apparatus according to a first preferred embodiment of the present invention is characterized by the image recording apparatus for sequentially exposing and recording plural holographic stereogram images or hologram images against a strip-like film like hologram recording medium, including a recording member for exposing and recording the recording plural holographic stereogram images or hologram images onto the hologram recording medium, and exposing and recording an identification image at a forward or backward portion of each of holographic stereogram images or each of hologram images in a longitudinal direction of the hologram recording medium.

Such image recording apparatus according to the first preferred embodiment of the present invention exposes and records an identification image at a forward or backward portion of each of holographic stereogram images or each of hologram images in a longitudinal direction of the hologram recording medium, at the event of exposing and recording a holographic stereogram image or a hologram image against the hologram recording medium by a recording means.

Further, an image recording method according to the first preferred embodiment of the present invention for sequentially exposing and recording plural holographic stereogram images or hologram images es the steps of: exposing and recording the recording plural holographic stereogram images or hologram images onto the hologram recording medium, and exposing and recording an identification image at a forward or backward portion of each of holographic stereogram images or each of hologram images in a longitudinal direction of the hologram recording medium.

Such image recording method according to the first preferred embodiment of the present invention exposes and records an identification image at a forward or backward portion of each of holographic stereogram images or each of hologram images in a longitudinal direction of the, hologram recording medium, at the event of exposing and recording a holographic stereogram image or a hologram image against the hologram recording medium by a recording means.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which:

FIG. 3A shows an original status. FIG. 3B shows the exposure status. And FIG. 3C shows a fixation status according to a preferred embodiment of the present invention;

FIGS. 5A and 5B show views for explaining about an optical system of the holographic stereogram producing apparatus. FIG. 5A shows a front elevation view of the optical system of the holographic stereogram producing apparatus. And FIG. 5B shows a plan view of an optical system of a holographic stereogram producing apparatus according to a preferred embodiment of the present invention;

FIG. 7A shows recording media designed for hologram to which the fixation process is applied with the fixation processing apparatus; FIG. 7B shows cutting out pieces of hologram recording medium; FIG. 7C shows a status in which overlapping the pieces of hologram recording medium and a mounting made of paper or the like and thereafter sandwiching the recording medium between the mounting and a protecting film; FIG. 7D shows a view for showing an image card as a print;

FIG. 9 shows a plan view of the print producing apparatus according to a preferred embodiment of the present invention;

FIGS. 10A and 10B show views for explaining about a positioning method of positioning recording mediums designed for hologram in the print producing apparatus according to a preferred embodiment of the present invention; FIG. 10A shows record mediums for holograms onto which identification lines as identification images are exposed and recorded by the holographic stereogram producing apparatus and FIG. 10B shows record mediums for holograms onto which identification-dots as identification images are exposed and recorded by the holographic stereogram producing apparatus; FIG. 11A shows a front elevation view of optical system of the holographic stereogram producing apparatus and FIG. 11B shows a plan view of optical system of the holographic stereogram producing apparatus.

BEST MODE FOR CARRYING OUT THE INVENTION

Configurations of preferred embodiments of the present invention will be explained in detail, referring 10 the appended drawings.

Figure 1:
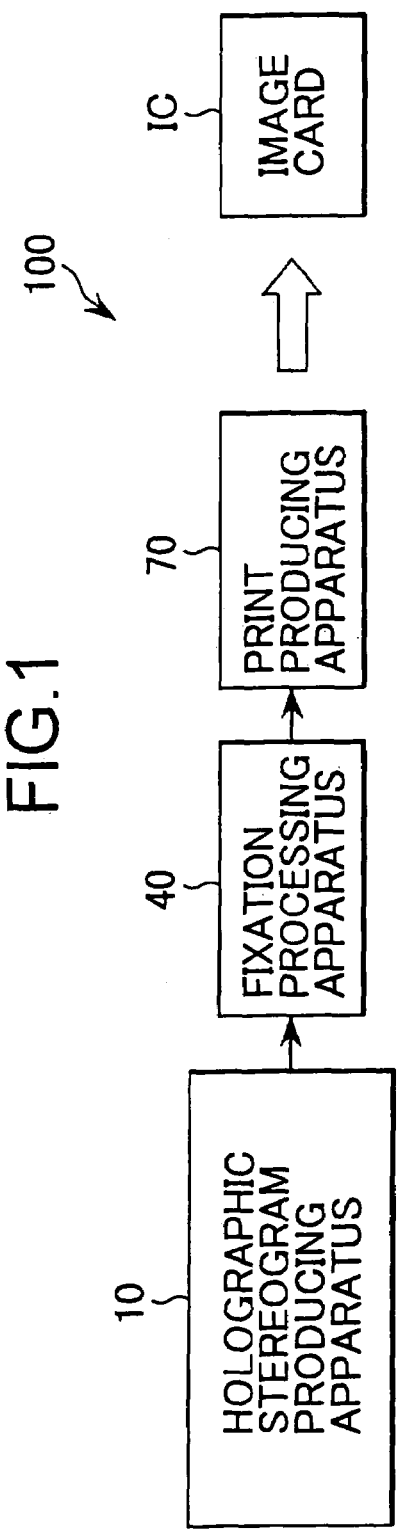
FIG. 1 shows a block diagram explaining about a constitution of a print producing system according to a preferred embodiment of the present invention.

An aspect of the preferred embodiment is shown in FIG. 1. The following apparatus constitutes the present print producing system 100. A holographic stereogram producing apparatus 10 produces a holographic stereogram by sequentially exposing and recording interference fringes as an element hologram in striped or dotted pattern manner onto a hologram recording medium made of a strip-like photosensitive film. A fixation processing apparatus 40 applies a predetermined fixation processing onto the produced holographic stereogram. The print producing apparatus 70 fabricates the recoding medium designed for hologram exposed and recorded, resulting in producing an image card IC designed for a print in which the holographic stereogram image is exposed and recorded. This print producing system 100 cuts out the elongated hologram recording medium in which plural holographic stereograms are sequentially exposed and recorded by a predetermined size by each of the holographic stereogram images, and laminates the cut out pieces of recording medium by heating and pressure-bonding a protecting film for protecting both sides of the cut out pieces of recording medium onto at least both sides of the piece, resulting in supplying the holographic stereogram image as a single image card IC exposed and recorded.

First, prior to explanation of each of apparatuses in the system 100, an exposing and recording principle of an element hologram used for a hologram recording medium will be explained.

Figure 2:
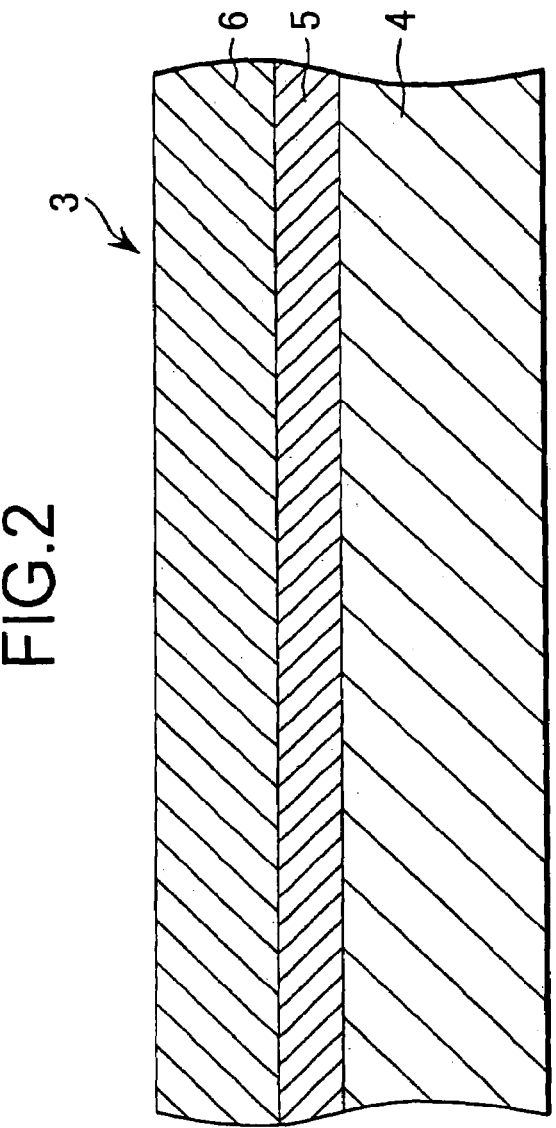
FIG. 2 shows a partial cross section view to explain about a record medium designed for hologram for the print producing system according to a preferred embodiment of the present invention.

As shown in FIG. 2, the hologram recording medium 3 is so to speak a film-application-type recording medium in which a photopolymer layer 5 made of photo-polymerized photopolymer is formed on a strip-like film-base 4 and in which a cover sheet layer 6 is formed bonding to the photopolymer layer 5.

Figure 3A:
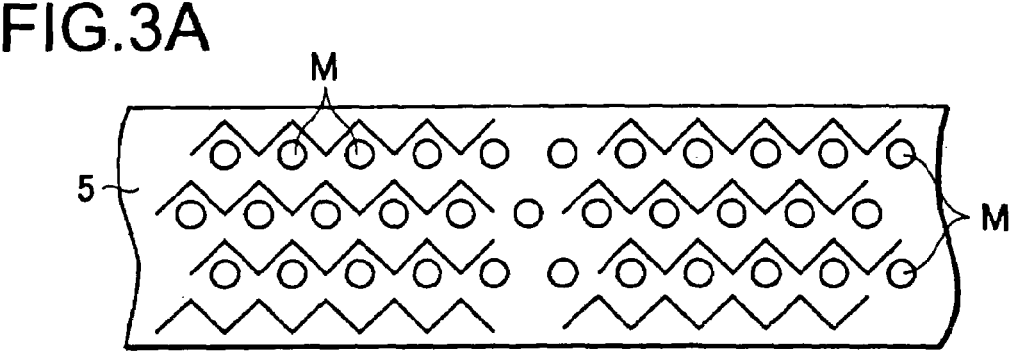
FIGS. 3A, 3B and 3C are views for explaining about a photosensing process of a record medium designed for hologram.
Figure 3B:
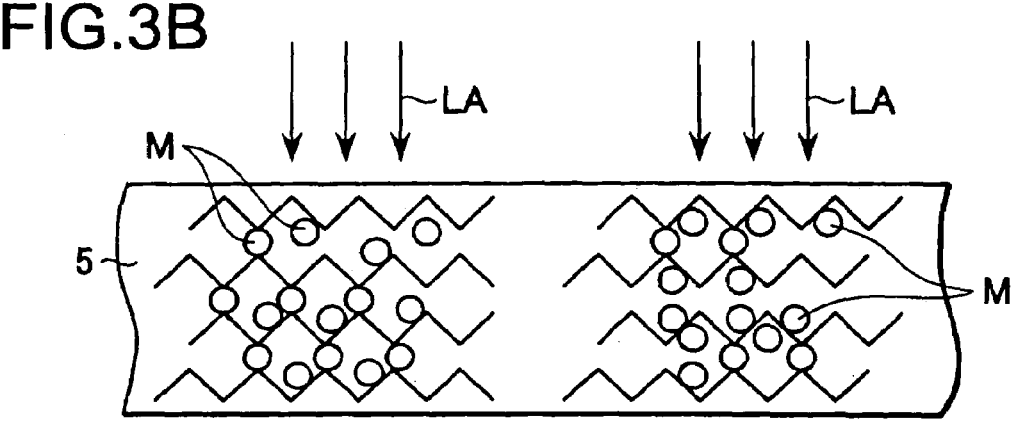

As shown in FIG. 3A, initially, the hologram recording medium 3 like this lies in a status where monomers M of photo-polymerized photopolymer constituting a photopolymer layer 5 is evenly dispersed in a matrix polymer. The photo-polymerized photopolymer is irradiated with a laser light LA having a power of 100 to 400 mJ/cm$^2$, resulting in obtaining a status where the monomers M evenly dispersed in the matrix polymer in an exposed portion are polymerized, namely a polymerized status.

Figure 3C:
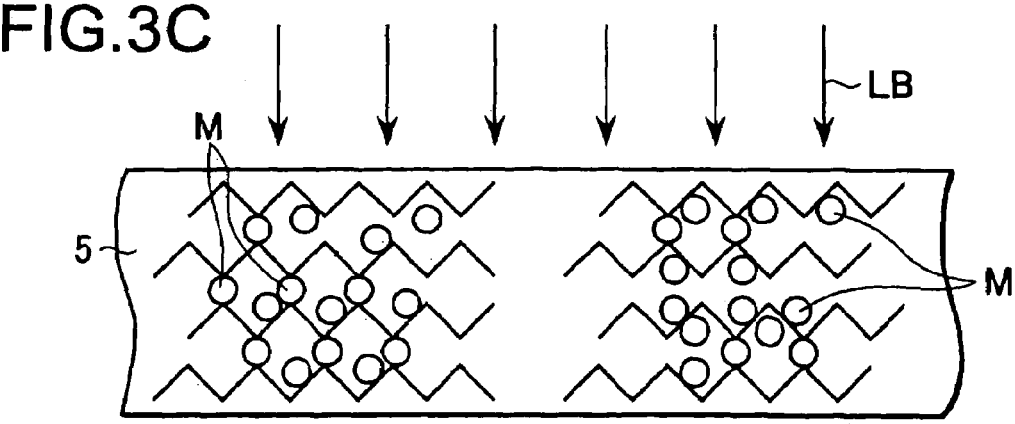

A photo-polymerized photopolymer changes a refractive index between an exposed portion and a non-exposed portion by unevenness of density of monomer M owing to motion of monomer M from circumference. As shown in FIG. 3C, thereafter the photo-polymerized photopolymers are irradiated with ultraviolet ray of power of 1000 mJ/cm$^2$ or visible light LB over the entire surface, thereby completing polymerization of the monomers M in the matrix polymer. Exposing and recording of the record medium designed for hologram 3 is performed, e.g. regarding interference fringes generated by interference between an object light and a reference light as alternation of the refractive index of the photo-polymerized photopolymer, because like this, the refractive index thereof is altered, depending on the incident laser light LA.

The print producing system 100 can omit a step of applying a particular development processing to the hologram recording medium 3 after exposure processing by the holographic stereogram producing apparatus 10, because the film-application-type recording medium is employed in which the photopolymer layer 5 is constituted with such a photo-polymerized photopolymer as the hologram recording medium 3. Therefore, the print producing system 100 can simplify the whole constitution because a developing apparatus and so on are unnecessary and can rapidly produce a holographic stereogram.

Figure 4:
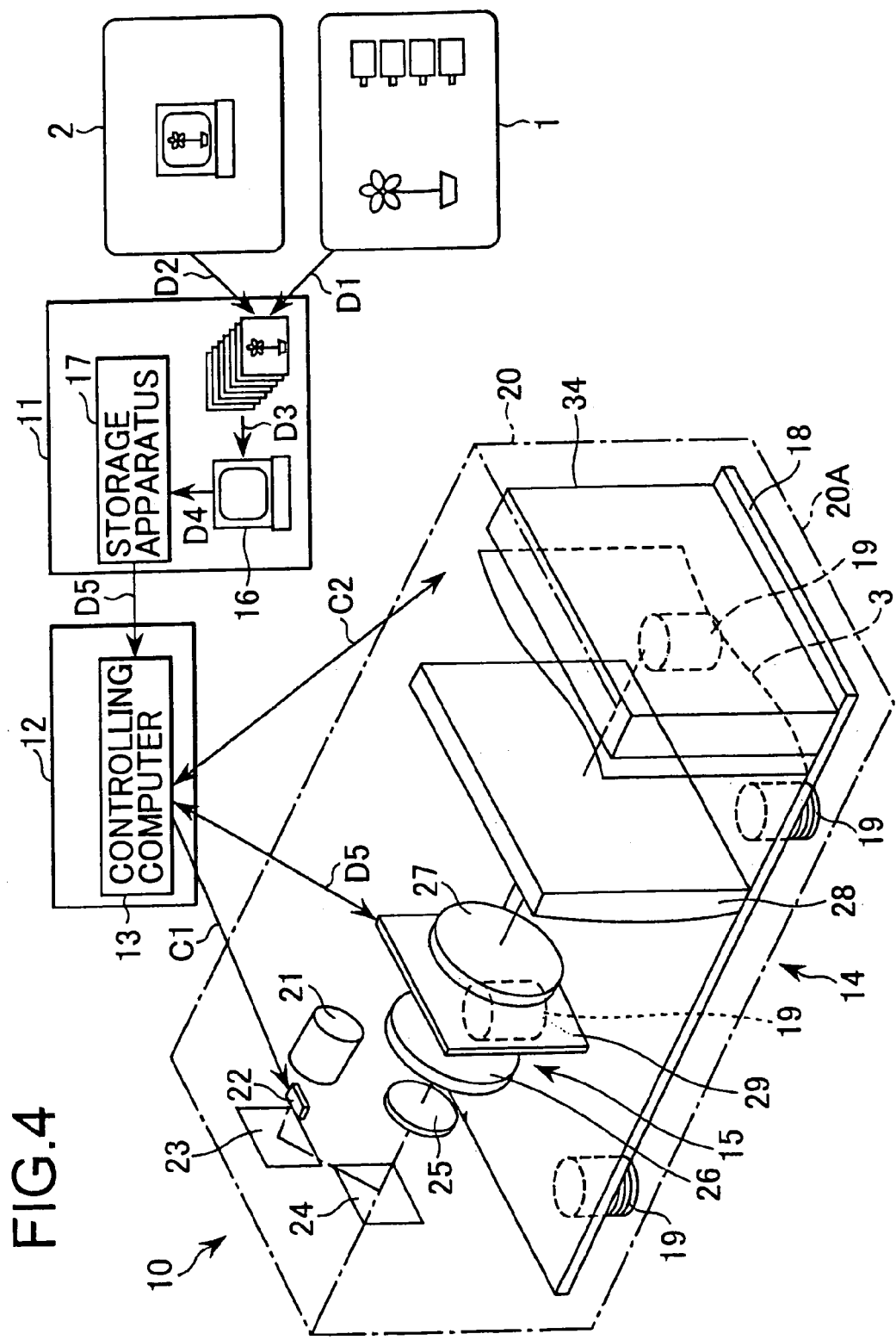
FIG. 4 is a view for explaining about a total constitution of a holographic stereogram producing apparatus that the print producing system has provided, according to a preferred embodiment of the present invention.

First, the holographic stereogram producing apparatus 10 in the print producing system will be described. The holographic stereogram producing apparatus 10 exposes and records a holographic stereogram image onto the above-mentioned hologram recording medium 3. As shown in FIG. 4, for example, the holographic stereogram producing apparatus 10 is provided with an image data processing section 11, a controlling section 12 having a control computer 13 for totally controlling the holographic stereogram producing apparatus 10, and a holographic stereogram producing section 14 having an optical system 15 for producing a holographic stereogram.

The image data processing section 11 has a computer 16 for image processing and a storage apparatus 17. For example, this section 11 generates parallax image data sequence D3 based on image data such as captured image data D1 including parallax information provided from parallax image sequence imaging apparatus 1 having a multi reflex camera or a moving camera or the like and computer image data D2 including parallax information generated by the computer for generating the image data.

In addition, the captured image data D1 denotes plural data obtained by simultaneous imaging operation with a multi-reflex type lens or consecutive imaging operation with a moving camera. Parallax information is included in each of image data constituting the image captured image data D1. The computer image data D2 are directed to e.g. plural image data produced as CAD (Computer Aided Design) and CG (Computer Graphics). Parallax information is included in each of image data constituting the computer image data D2.

The image data processing section 11 generates a hologram image data D4, applying a predetermined image processing for a holographic stereogram by the computer for processing an image 16 to the parallax image data sequence D3 based on the image captured image data D1 and/or the computer image data D2. The hologram image data D4 is e.g. temporarily stored into a storage apparatus 17 such as a memory or a hard disk drive or the like. As mentioned below, the image data processing section 11 sequentially reads out an element hologram image data D5 by each single image from the hologram image data D4 stored in the storage apparatus 17 when the element hologram image is exposed and recorded onto the hologram recording medium 3, while the section 11 provides the element hologram image data D5 to the control computer 13 in the controlling section 12.

The control computer 13 controls the holographic stereogram producing section 14 to sequentially expose and record element display images based on the element hologram image data D5 provided by the image data processing section 11, as stripe-shaped element hologram onto the hologram recording medium 3 set in a part of the holographic stereogram producing section 14. Then, as mentioned below, the control computer 13 controls operation of each of mechanisms of the holographic stereogram producing section 14.

In the holographic stereogram producing section 14, each member constituting an optical system 15 is positioned supported by a supporting substrate (optical table) 18, which is supported by an apparatus casing 20 by way of a damper.19.

The optical system 15 has a light incident system 15A, an object optical system 15B and a reference optical system 15C as shown in FIGS. 4 and 5. The object optical system 15A and the reference optical system 15c are arranged so that an optical path length of an object light L2 from the system 15A to an exposing and recording section P1 is substantially equal as that of a reference light L3 from the system 15B to the exposing and recording section P1 in order to improve interference propensity between the object light L2 and the reference light L3.

The light incident optical system 15A has a laser light source 21 for emitting a laser light L1, a shutter mechanism 22 for making the laser light L1 incident on following section or shielded, and a half mirror 23 for having the laser light L1 divided into the object light L2 and the reference light L3.

The laser light source 21 is constituted by a laser apparatus such as a semiconductor excitation YAG laser apparatus, an air-cooled Ar ion laser apparatus or an air-cooled Kr laser apparatus, which emit the laser light L1 having a single wavelength and optimum interference propensity.

The shutter mechanism 22 is opened or closed with a controlling signal C1 output from the controlling computer 13 corresponding to output timing of the image data D5 of the element holograms, making the laser light L1 incident on a hologram recording medium 3 positioned at an exposing and recording section P1 after traveling by way of following optical system, or having incidence of the laser light L1 onto the hologram recording medium, shielded.

The half mirror 23 divides the incident laser light L1 into a transmission light and a reflection light. The transmission light owing to the laser light L1 is used as the above object light L2, while the reflection light thereby is used as the reference light L3. The object light L2 and the reference light L3 are respectively incident on an object optical system 15B and a reference optical system 15C arranged in following section.

In addition, although not shown in the figures, the incident optical system 15A may have a total reflection mirror or the like in order to properly change a traveling direction of the laser light L1 to make an optical path of the object light L2 and an optical path of the reference light L3 have a same length. Further, the shutter mechanism 22 may be constituted so that the shutter member is mechanically driven or constituted by an electric shutter with an Acousto-Optic Modulation (AOM). Namely, the shutter mechanism 22 has only to be a member capable of be freely opened and closed so that the laser light L1 can be transmitted and shielded.

The object optical system 15B is constituted by sequentially arranging optical members such as a total reflection mirror 24, a first cylindrical lens 25, a collimator lens 26, a projection lens 27, and a second cylindrical lens 28 in order from the light incident side along an optical axle.

The total reflection mirror 24 totally reflects the object light L2 transmitted through the half mirror 23. The object light L2 total-reflected by this total reflection mirror 24 is provided into the first cylindrical lens 25.

The first cylindrical lens 25 is constituted by combination of a convex lens and a pinhole to diffuse the objection light L2 totally reflected by the total reflection mirror 24 in one-dimensional direction, corresponding to width of surface of display of the below-mentioned transmission type liquid crystal display 29.

The collimator lens 26 changes the object light L2 diffused by the first cylindrical lens 25 into a parallel light and thereafter introduce the parallel light onto the transmission type liquid crystal display 29.

The projection lens 27 projects the object light L2 onto the second cylindrical lens 28.

The second cylindrical lens 28 converges the object light L2 changed as the parallel light in the horizontal direction in FIG. 5B onto the exposing and recording section P1.

The transmission type liquid crystal display 29 is arranged between the collimator lens 26 and the projection lens 27 in the object optical system 15B. The transmission type liquid crystal display 29 sequentially displays an element hologram image based on the image data D5 of the element hologram provided from the control computer 13. In addition, the controlling computer 13 provides, depending on the output timing of image D5 of the element hologram, a driving signal C2 to the recording medium conveying mechanism 34 mentioned below for the hologram recording medium 3. By performing this activation control, the control computer 13 controls the conveying operation of the hologram recording medium 3.

The object optical system 15B has the object light L2 in a point light source state being incident which is divided from the incident optical system 15A, diffused by the first cylindrical lens 25 and changes the diffused light into a parallel light by incidence on the collimator lens 26. The object optical system 15B has the object light L2 incident on the transmission type liquid crystal display 29 by way of the collimator lens 26 modulated, depending on an element hologram and makes the modulated object light L2 incident on the second cylindrical lens 28 by the projection lens 27. The object optical system 15B modulated corresponding to the element hologram image displayed by the transmission type liquid crystal display makes the modulated object light L2 incident on the hologram recording medium, of the exposing and recording section P1 while the shutter mechanism 22 is being opened to expose and record the incident modulated object light L2 corresponding to an element hologram image.

The reference optical system 15C is constituted by sequentially arranging the cylindrical lens 30, the collimator lens 31 and the total reflection mirror 32 in order from the light input side along an optical axle.

The cylindrical lens 30 is constituted by combination of a convex lens and a pinhole in a same manner of the first cylindrical lens 25 in the above object optical system 15B to diffuse the reference light L3 reflected and divided by the half mirror 23 by a predetermined width, concretely explaining, diffuse the light L3 in one-dimensional direction, corresponding to a width of surface of display of the transmission liquid crystal display 29.

The collimator lens 31 changes the reference light 13 diffused by cylindrical lens 30 into a parallel light.

The total reflection mirror 32 have the reference light L3 reflected, introduced to backward of the hologram recording medium 3 in the exposing and recording section P1 and incident on the hologram recording medium 3.

In addition, as above-mentioned, the shutter mechanism 22 has been explained so that the shutter mechanism 22 is provided at the light incident optical system 15A. However, the shutter mechanism 22 is not limited to such a constitution. The shutter mechanisms 22 may be arranged before and after the hologram recording medium 3 of the exposing and recording section P1 in both the object optical system 15B and the reference optical system 15C, respectively. Further, the shutter mechanisms 22 may be arranged just before a position where the object light L2 and the reference light L3 are incident on the hologram recording medium 3, performing control such as incidence or shielding of light by synchronization of these arranged mechanisms.

As above-mentioned, such an optical system 15 is constituted so that an optical path of the object optical system 15B which is an optical system through which the object light L2 divided by the half mirror 23 travels has a length that is substantially identical lo the reference optical system 15C through which the reference light L3 travels. Accordingly, the optical system 15 can improve interference propensity between the object light L2 and the reference light L3, resulting in producing a holographic stereogram by which more distinctly reproduced image can be obtained.

Further, when necessary, the optical system 15 is provided with an interference fringe detecting section 33 for stopping exposure and record of the hologram recording medium 3, when there is fear that a desirable holographic stereogram can not be obtained due to vibration or the like.

The interference fringe detecting section 33 detects a status of interference fringes formed by the object light L2 and the reference light L3 which are respectively incident on the hologram recording medium 3 by way of each of the above-mentioned optical systems. The interference fringe detecting section 33 is e.g. constituted by a charge coupled device (CCD) and detects a status of fluctuation of interference fringes formed in a detected area being different from the area where a holographic stereogram is exposed and formed in the hologram recording medium 3 by order of wavelength of the laser light L1 emitted from the laser light source 21.

The interference fringe detecting section 33 provides a detection signal to the control computer 13 when appearance of interference fringes in fluctuation status indicating a value more than a predetermined value in the detected area. The control computer 13 changes the shutter mechanism 22 into a non-activation status based on the detection signal. Thus, shielding the object light L2 and the reference light L2 slop production of holographic stereogram at the hologram recording medium 3. Further, the interference fringe detecting section 33 stops providing a detection signal to the control computer 13 when interference fringes formed in the detected area lie in a fluctuation status indicating a value more than a predetermined value. Thereby the control computer 13 makes the object light L2 and the reference light L3 incident onto the hologram recording medium 3, changing the shutter mechanism 22 into an activation status, resulting in being capable of producing a holographic stereogram.

As above-mentioned, the holographic stereogram producing apparatus 10 can expose and record a holographic stereogram onto the hologram recording medium 3 by having the interference fringe detecting section 33, so that interference fringes by the object light L2 and the reference light L3 can lie stablestatus. Thereby, the interference fringe detecting section 33 can produce a brighter holographic stereogram having higher diffraction efficiency. Further, by having the interference fringe detection section 33, the holographic stereogram producing apparatus 10 becomes more convenient to utilize as being free from limitations such as a setting place.

In addition, though it has been explained that the above-mentioned interference fringe detecting section 33 is positioned near the hologram recording medium 3 and detects a part of the interference fringes formed in the detected area, the preferred embodiments of the present invention are not limited by such features and structures. For example, the interference fringe detecting section 33 may introduce a part of the object light L2 and that of the reference light L3 to any other position with a mirror or the like to form interference fringes to detect the interference fringes. Further, the interference fringe detection section 33 may form interference fringes by detecting light which have been divided into the object light L2 and the reference light L3 by means of a half mirror or the like. In addition, the interference detecting section 33 may form interference fringes by detection light divided into the objection light L2 and the reference light L3. Moreover, the interference fringe detecting section 33 may form interference fringes for detecting vibration by directly taking out a part of the laser light L1 emitted from the laser light source 21 to detect the interference fringes. Furthermore, the interference fringe detection section 33 may be provided with any other optical system for detecting vibration other than the optical system 15 to detect the interference fringes by the any other optical system to detect occurrence of vibration.

Furthermore, the holographic stereogram producing apparatus 10 has a recording medium conveying mechanism 34 for intermittently conveying the hologram recording medium 3 toward a direction indicated by the arrow a in FIG. 5 by an amount corresponding to a single element hologram.

The record medium conveying mechanism 34 intermittently drives the hologram recording medium 3 based on a driving signal C2 provided from the control computer 13. Further, the holographic stereogram producing apparatus 10 opens an optical path of the laser light L1 by activating the shutter mechanism 22 based on a controlling signal C1 provided from the control computer 13, interlocking with activation of the recording medium conveying mechanism 34.

As shown in FIG. 4, the holographic stereogram producing apparatus 10 like this is constituted by mounting each of constitutional members or parts etc. for the above-mentioned optical system 15 on a supporting substrate 18 made of aluminum-plate or aluminum-alloy plate or the like. As above-mentioned, when vibration or the like is added thereto from outside, the object light L2 and the reference light L3 are not incident on the recording medium 3 designed for hologram in a stable status, so that a situation occurs such that any interference fringes lying in an optimum status for the hologram recording medium 3 is not exposed and recorded. Therefore, the holographic stereogram producing apparatus 10 supports the supporting substrate 18 in order to suppress such affection owing to vibration etc. against the optical system 15 and the like by plural dampers 19.

Detailed explanation of each of the dampers 19 is omitted herein. However, optionally, the dampers 19 are made of a resilient member such as an air spring, a rubber, or a coil spring. Each of end portions of the dampers 19 is coupled to the supporting substrate 18, so that each of the dampers 19 supports the substrate 18. The other end portion thereof is fixed to the top portion of the mounting 20A of the apparatus casing 20. These dampers 19 are activated so that vibration and the like added to the optical system 15 from outside becomes equal to or less than the wavelength of the laser light L1 substantially having 1 $\mu$m or preferably equal to $\frac{1}{5}$ of the wavelength of the laser light L1 so that the vibration is inhibited. Therefore, in the holographic stereogram apparatus 10, even when vibration or the like is added from outside thereto, the object light L2 and the reference light L3 are incident on the hologram recording medium 3 in a stable status without receiving any disturbance. Thereby, the holographic stereogram apparatus 10 can produce a brighter holographic stereogram whose diffraction efficiency is optimum.

The holographic stereogram producing apparatus 10 like this drives the hologram recording medium 3 by an amount corresponding to a single element hologram along the running path and stops the recording medium 3, making a non-exposed portion correspond to the exposing and recording section P1 by providing the driving signal C2 corresponding to the single element hologram from the control computer 13 in the controlling section 12 to the recording medium conveying mechanism 34 by each time when exposing and recording by each element image is completed. In addition, the holographic stereogram producing apparatus 10 rapidly stops vibration occurred in the hologram recording medium 3 accompanying with running activation of the hologram recording medium 3. As above-mentioned, the hologram recording medium 3 is made of a strip-like photosensitive film. For example, the recording medium 3 is reeled around a supplying roll rotatably arranged in inside of the film cartridge whose whole portion is maintained in a shielding status, which is not shown in the figures. The hologram recording medium 3 is fed to the inside of the holographic stereogram producing apparatus 10 and run on a running path with the record medium conveying mechanism 34, when the film cartridge is loaded into the holographic stereogram producing apparatus 10.

The holographic stereogram producing apparatus 10 makes the object light L2 and the reference light L3 modulated from both sides of hologram recording medium 3 when opening the shutter mechanism 22 in the above-mentioned status, incident on the hologram recording medium 3 at the exposing and recording section P1 to expose and record interference fringes corresponding to the element hologram. After completing exposure and recording of a signal element image and thereafter providing the driving signal C2 from the control computer 13 at the controlling section 12 to the recording medium conveying mechanism 34, the holographic stereogram producing apparatus 10 rapidly drives the hologram recording medium 3 by a predetermined amount and thereafter stops the running. In addition, the hologram recording medium 3 is reeled by a reeling roller, not shown in the figures.

By sequentially performing the above-mentioned operations, the holographic stereogram producing apparatus 10 sequentially exposes and records plural holographic stereogram images onto the elongated hologram recording medium 3 to produce a holographic stereogram.

Figure 6:
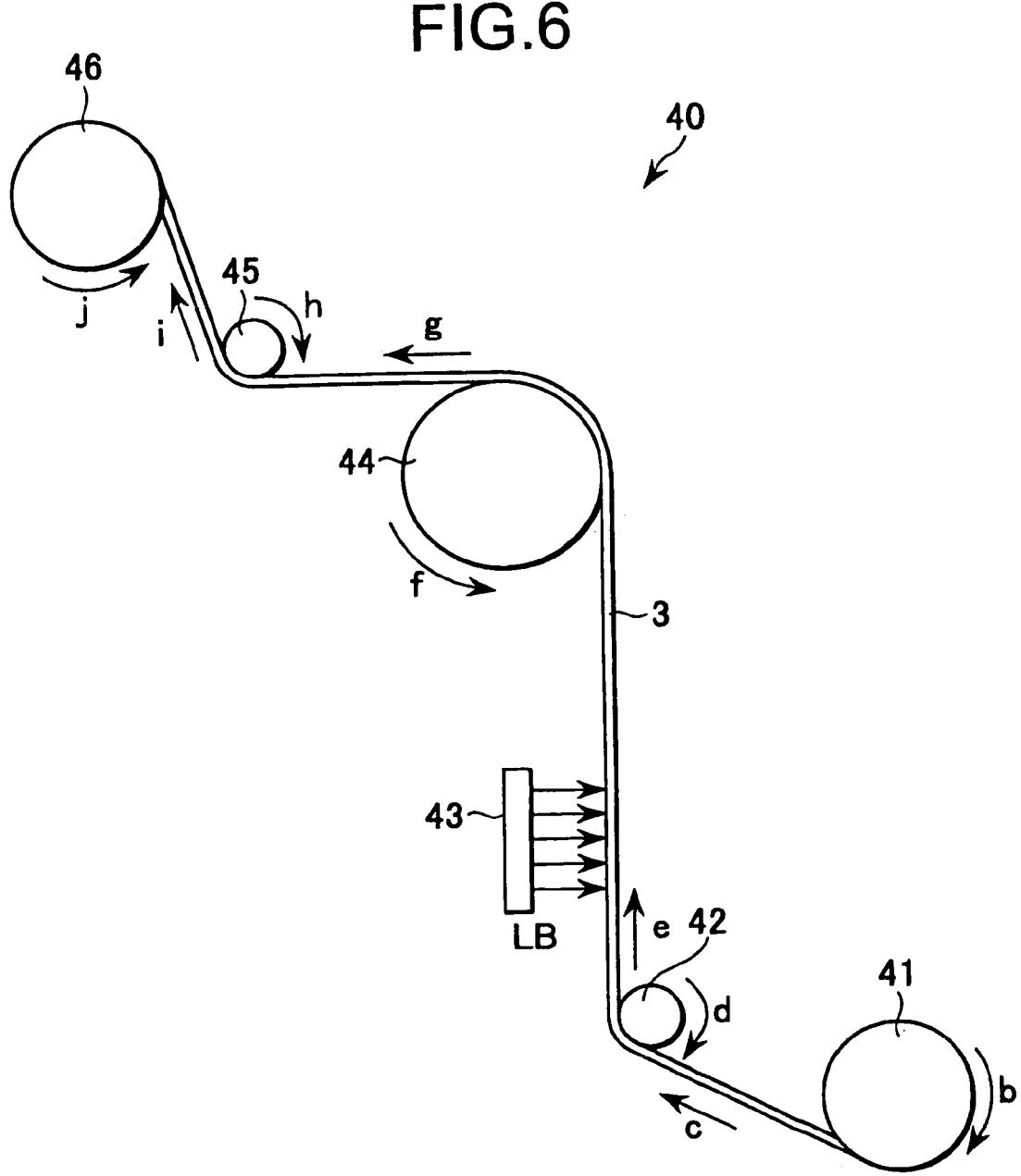
FIG. 6 shows a plan view of a fixation processing apparatus that the print producing system has provided, according to a preferred embodiment of the present invention.

The fixation processing apparatus 40 in the print producing system 100 will be explained next. The fixation processing apparatus 40 performs a fixation process including a process for irradiating an ultraviolet ray LB onto the hologram recording medium 3 and a heating process for heating the hologram recording medium 3 at a predetermined temperature. Thereby, the fixation processing system apparatus 40 fixes a holographic stereogram image exposed and recorded onto the recording medium 3 designed for hologram 3 by the holographic stereogram producing apparatus 10. As shown in FIG. 6, for example, the fixation processing apparatus 40 is provided with a supplying roller 41 for supplying the hologram recording medium 3, guide rollers 42 and 45 for retaining and running the hologram recording medium 3, the ultraviolet ray lamp 43 for irradiating the ultraviolet ray LB onto the hologram recording medium 3, a heating roller 44 for heating the hologram recording medium 3 and the reeling roller 46 for reeling the hologram recording medium 3.

The supplying roller 41 can be attached to the fixation processing 40 and detached there from. The supplying roller 41 is axially fixed to an axis not shown in a rotating direction represented by an arrow b. The guide roller 41 feeds the reeled hologram recording medium 3 in a direction indicated by an arrow c.

The guide roller 42 is rotatably fixed on a supporting axle, not shown, in a direction indicated by an arrow d. The guide roller 42 retains the hologram recording medium 3 provided from the supplying roller 41 and feeds the hologram recording medium 3 in a direction indicated by an arrow e.

The ultraviolet ray lamp 43 is arranged along a running path between the guide roller 42 and the below-mentioned healing roller 44. The ultraviolet ray lamp 43 irradiates an ultraviolet ray LB having power of substantially 1000 mJ/cm$^2$ onto the hologram recording medium 3 in which a holographic stereogram is exposed and recorded with interference fringes produced by the object light L2 and the reference light L3 to complete polymerization of the monomers M in the matrix polymer.

The heating roller 44 is rotatably fixed onto a supporting axle in a rotating direction indicated by an arrow f. The heat roller 44 (not shown in the figure) tightly abuts the hologram recording medium 3 onto the circumference of the roller 44, having a reeling angle corresponding to substantially half of whole circumference over the roller 44 and having the medium 3 abutted to the circumference surface without clearance, and drives the medium 3. An inside of the heating roller 44 is provided with a heater, by which the roller 44 is maintained at a temperature of approximately 120 C. The heating roller 44 heats the hologram recording medium 3 under temperature by the heater and improves a modulation degree of refractive index of the above-mentioned photopolymer layer 5. The heating roller 44 drives/conveys the heated hologram recording medium 3 in a direction indicated by an arrow g.

The guide roller 45 is fixed to a supporting axle in a rotating direction indicated by an arrow h. The guide roller 45 retains the hologram recording medium 3 provided by way of the heat roller 44 and feeds the medium 3 in a direction indicated by an arrow i.

The reeling roller 46 is attachable to the fixation processing apparatus 40 and detachable there from. The roller 46 is rotatably fixed to a supporting axle (not shown in the figures) in a rotating direction indicated by an arrow j. The reeling roller 46 reels then hologram recording medium 3 that has been fixed when the roller 46 is mounted onto the fixation processing apparatus 40.

The fixation processing apparatus 40 like this rotates the supplying roller 41, the guide rollers 42 and 45, the heating roller 44, and the reeling roller 46 and applies the fixation processing to the hologram recording medium 3 under control by a controlling section.

Figure 7A:
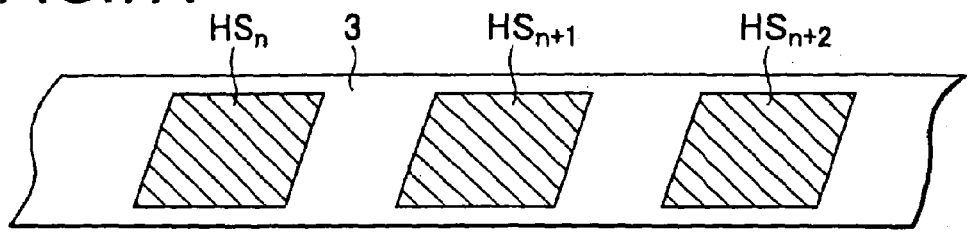
FIGS. 7A, 7B, 7C and 7D show views for explaining about processing contents in the print producing apparatus that the print producing system has provided, according to a preferred embodiment of the present invention.
Figure 7B:
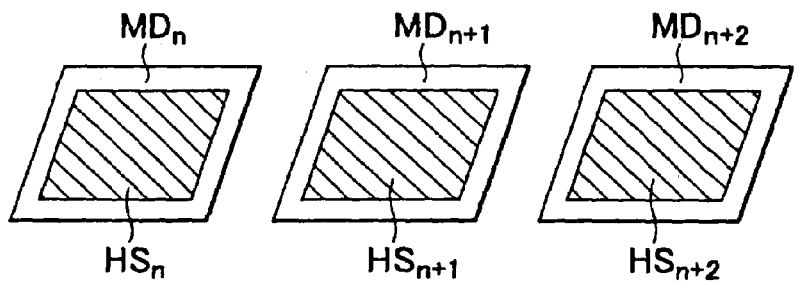
Figure 7C:
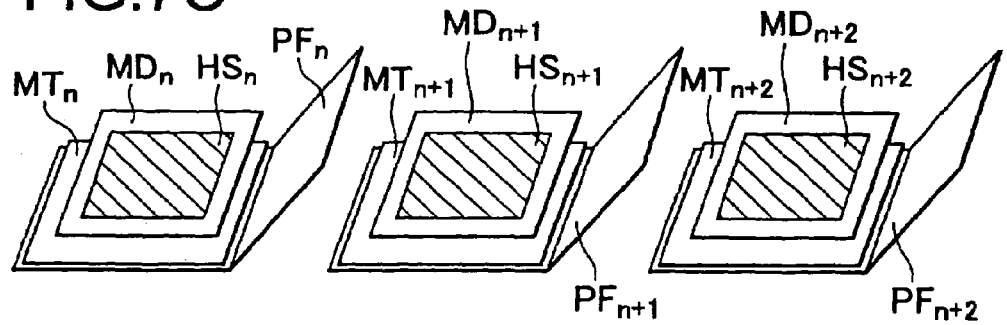
Figure 7D:
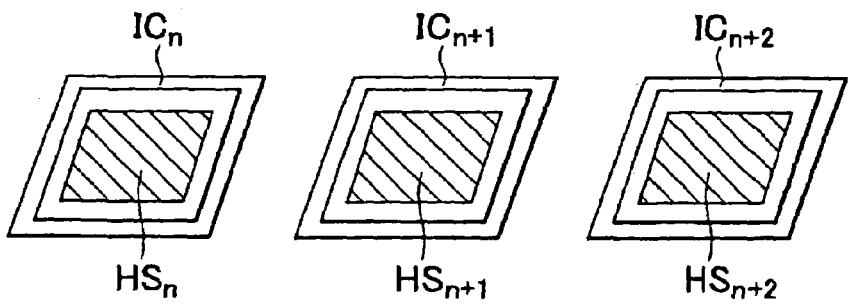

Next, the print producing apparatus 70 of the print producing system 100 will be hereinafter explained by the fixation processing apparatus 40. As shown in FIG. 7A, the print producing apparatus 70 sequentially cuts out the elongated hologram recording medium 3 to which the fixation processing has been applied, in other words, the hologram recording medium 3 in which plural exposed and recorded holographic stereogram images denoted by HSn, HSn+1, and HSn+2 . . . are sequentially exposed and recorded. As shown in FIG. 7B, the apparatus 70 sequentially cuts out the cut out recording mediums 3 by a predetermined size by each of the plural exposed and recorded holographic stereogram images denoted by HSn, HSn+1, and HSn+2 . . . . As shown in FIG. 7C, each of pieces of plural cut out hologram recording medium 3 denoted by MDn, MDn+1, and MDn+2, . . . is overlapped over each of the mountings MTn, MTn+1, and MTn+2, . . . and thereafter laminated by heating and pressure-bonding. As a result, as shown in FIG. 7D, the apparatus 70 assembles plural image cards ICn, ICn+1, ICn+2, . . . in which the plural exposed and recorded holographic stereogram images denoted by HSn, HSn+1, and HSn+2 . . . are exposed and recorded, respectively. As shown FIGS. 8 and 9, the print producing apparatus 70 is provided with: a recording medium conveying section 71 which intermittently feeds the elongated hologram recording medium 3, a cutting out-section 72 which cuts out the recording medium 3 by a predetermined size, a conveying-conveying section 73 which conveys pieces of the recording medium cut out by the cutting out-section 72, a film retaining and supplying section 74 which retains a single sheet of protecting film which is folded in two and provide them to a predetermined mounting section, a film opening and closing section 75 which opens the sheet of protecting film which is folded in two along a folding line of the film and thereafter closing the sheet thereof, a mounting retaining and supplying section 76 which retains plural sheets of a mounting MT such as paper base, and a laminating section 77 which laminates the pieces of the hologram recording medium MD, and the mounting MT with the protecting film PF.

The recording medium conveying section 71 is arranged in a space formed by supporting substrates 78 and 79 and a side wall 80. The recording medium conveying section 71 has a supplying roller 81 which provides the hologram recording medium 3, guide rollers 82 and 83 which constitute a supplying path on which the recording medium 3 is run, and a reeling roller 84 for reeling the recording medium 3.

The supplying roller 81 is attachable to the print producing apparatus 70 and detachable there from. The roller 81 is supported by one end portion of a supporting axle to the side wall 80 in a status where the elongated hologram recording medium 3 which has been fixed by the fixation processing apparatus 40 has been reeled. The roller 81 is rolatably fixed onto the supporting axle in a rotating direction denoted by an arrow k in FIG. 8. The supplying roller 81 intermittently feeds the reeled hologram recording medium 3 in a direction represented by an arrow L in FIG. 8.

The guide roller 82 is supported by one end portion of a supporting axle (not shown) against the side wall 80. The roller 82 is rotatably fixed lo the supporting axle in a rotating direction indicated by an arrow m in FIG. 8. The guide roller 82 retains the hologram recording medium 3 intermittently provided from the supplying roller 81 and intermittently drives the recording medium 3 in a direction represented by an arrow n in FIG. 8 and FIG. 9.

The guide roller 83 is supported by one end portion of a supporting axle (not shown) to the side wall 80. The roller 83 is rotatably fixed in a rotating direction indicated by an arrow o in FIG. 8. The guide roller 83 retains the hologram recording medium 3 provided by way of the supplying roller 82 and intermittently drives the recording medium 3 in a direction represented by an arrow p in FIG. 8.

The reeling roller 84 is attachable to the print producing apparatus 70 and detachable there from. The reeling roller 84 is supported by one end portion by a supporting axle to the side wall 80. The reeling roller 84 is rotatably positioned on the supporting axle in a rotating direction indicated by an arrow q in FIG. 8. The reeling roller 84 reels a remaining part of the hologram recording medium MD cut out with the cutting out section 72 when the reeling roller 84 is mounted on the print producing apparatus 70.

The recording medium conveying section 71 like this intermittently rotates the supplying roller 81, the guide rollers 82 and 83, and the reeling roller 84 under control of a control section (not shown) to intermittently feed the hologram recording medium 3. Specifically, the recording medium conveying section 71 intermittently feeds the hologram recording medium 3 so that a position where the piece of the hologram recording medium MD is cut out by the cutting out section 72, is made to be corresponded to an opening section 85 opened at the supporting substrate 78. In addition, an example of controlling method for intermittent conveying operation will be explained below.

Figure 8:
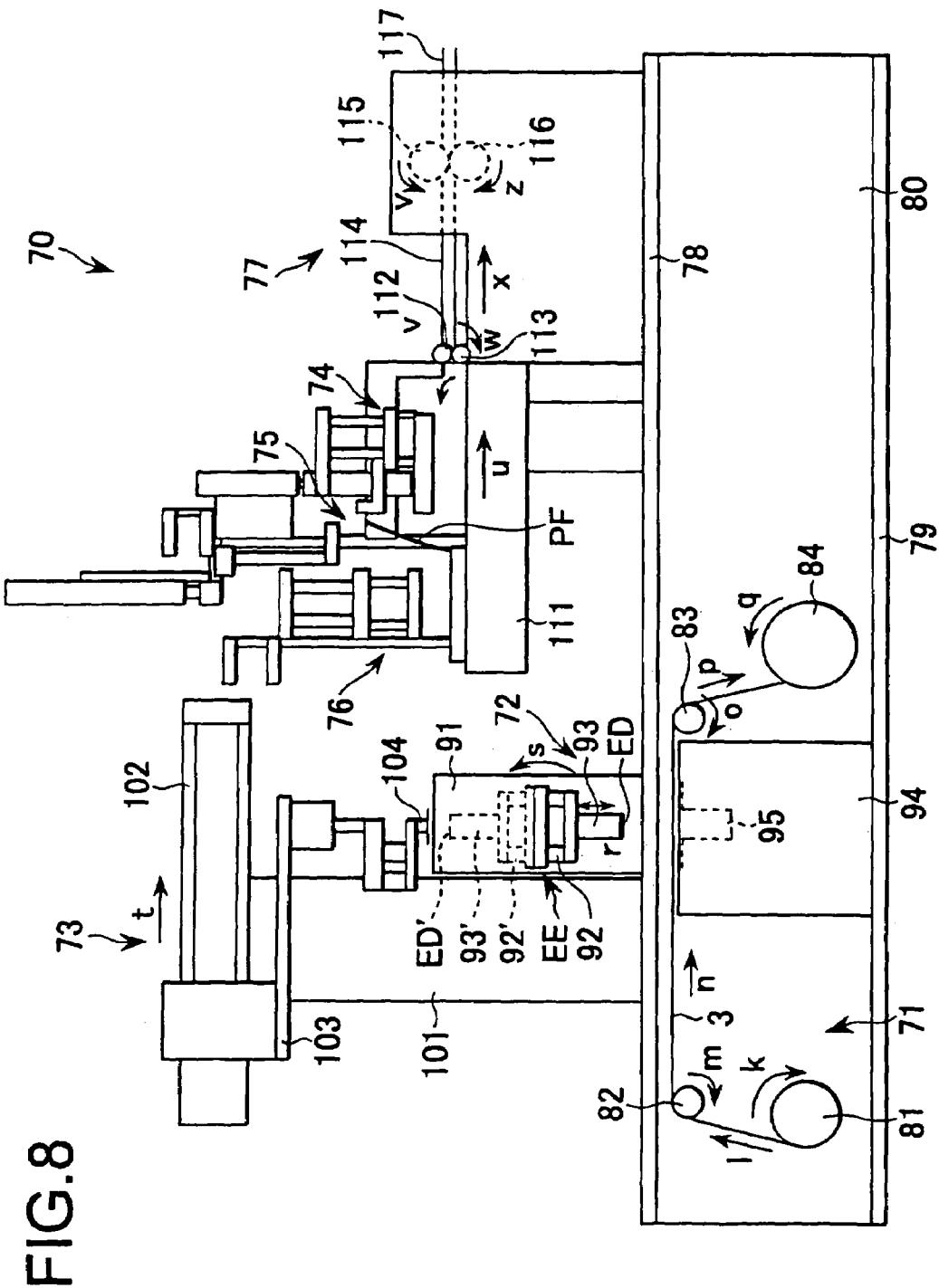
FIG. 8 shows a front elevation view of the print producing apparatus according to a preferred embodiment of the present invention.
Figures 11A, 11B:
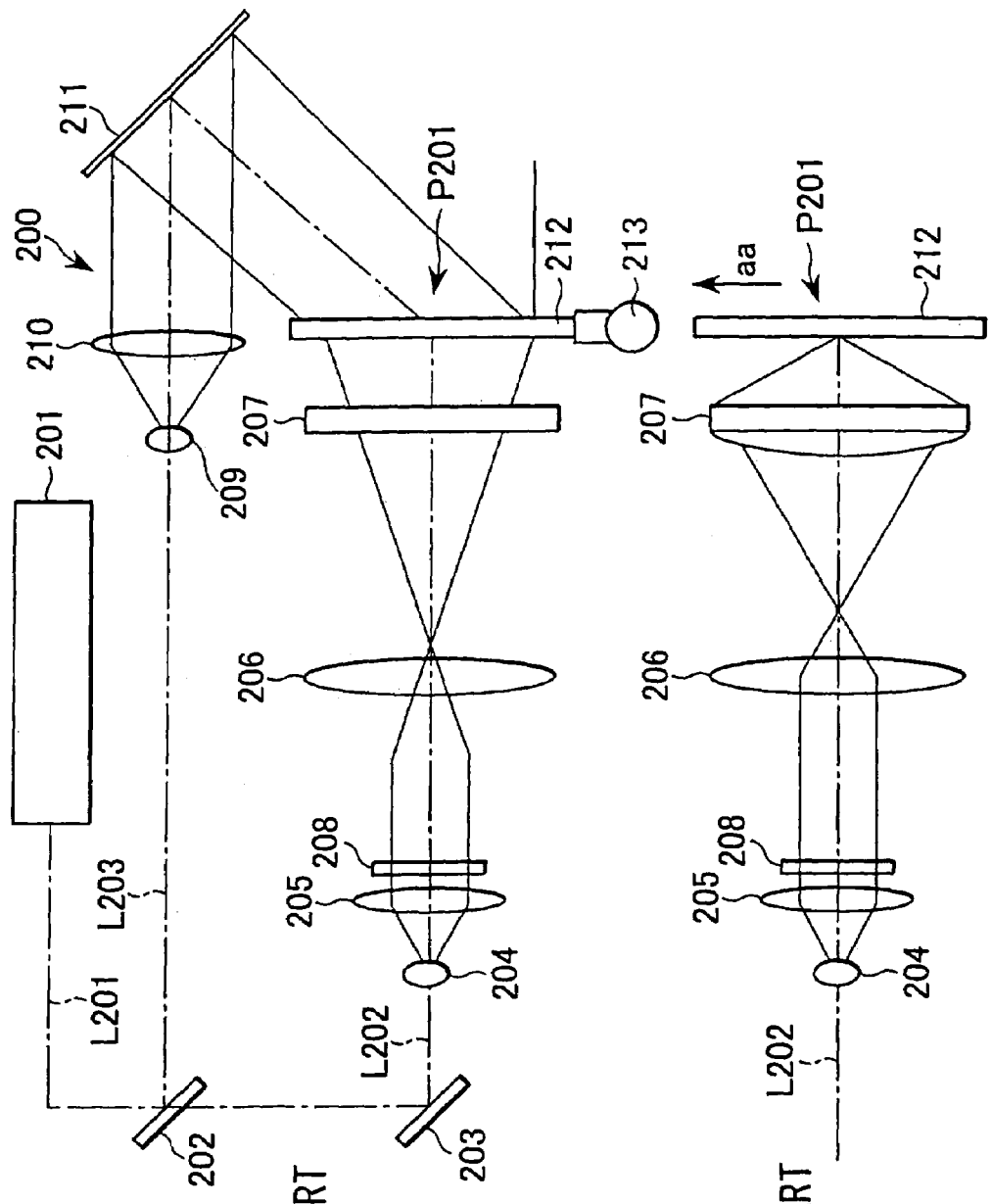
FIGS. 11A and 11B show a view for explaining about an optical system of a conventional holographic stereogram producing apparatus.

The cutting out section 72 has a guide column 91 positioned on the supporting substrate 78, a driving mechanism 92 which is driven up-and-down in a vertical direction represented by an arrow r along the guide column 91 in FIG. 8, and a cutter 93 which is fixed to the drive mechanism 92.

In the cutting out section 72, when the hologram recording medium 3 is intermittently fed with the recording medium conveying section 71 to arrive at a position where the holographic stereogram image HS exposed and recorded onto the medium 3 which is observed from the opening portion 85, the drive mechanism 92 is vertically driven downward along the guide column 91 under control of a controlling section. As a result, in the cutting out-section 72, a cutter 93 whose section is rectangular fixed to the drive mechanism 92 is vertically driven downwardly in a status where a blade edge ED of the cutter 93 lies toward downward, accompanying with drive of the drive mechanism 92. As shown in FIG. 7A, the cutting out-section 72 cuts out e.g. a rectangular area having a predetermined size at least including the holographic stereogram image HS to be cut out, corresponding to a portion of the elongated hologram recording medium 3 which is observed from the opening portion 85, as a piece of the hologram recording medium MD. Then, in the cutting out section 72, the drive mechanism 92 is vertically driven downward until the cutter 93 is pressed against a cutter insertion portion 95 bored on a base 94 positioned at a position corresponding to the opening portion 85 in a space formed by the supporting substrates 78 and 79 and the side wall 80.

In addition, in the cutting out section 72, when the cut out pieces of the hologram recording medium MD are absorbingly attached to the blade edge portion ED in the cutter 93, the drive mechanism 92 is vertically driven upward along the guide column 91 under control of a controlling section. Therefore, in the cutting out section 72, the cutter 93 is vertically driven upward, accompanying with drive of the drive mechanism 92. Thereafter, in the cutting out section 72, when the drive mechanism 92 is vertically driven upward by a predetermined position, the drive mechanism 92 is symmetrically rotated by 180 degrees toward a direction indicated by an arrow s in FIG. 8, about the end potion of the drive mechanism 92 defined as an axle. Namely, in the cutting out section 72, the drive mechanism 92 is rotated about and symmetrically with respect to the end portion indicated by an arrow EE as the drive mechanism 92' indicated by a dotted-line portion in FIG. 8. Further, therein, the cutter 83 is also rotated by 180 degrees, accompanying with rotational drive of the drive mechanism 92, resulting in obtaining a status in which a blade edge portion ED' absorbingly attached to the pieces of hologram recording medium MD is directed upward.

In the cutting out-section 72, the drive mechanism 92 is driven under control of the controlling section (not shown in the figures) to cut out a piece of the hologram recording medium MD from the hologram recording medium 3. The drive mechanism 92 is symmetrically rotated by 180 degrees in a status in which the cut out piece of hologram recording medium MD is absorbingly attached to the blade edge portion ED. In the cutting out section 72, the hologram recording medium 3 is intermittently fed by the recording medium conveying section 71. Such an operation is repeatedly performed, whenever the holographic stereogram HS is observed from the opening portion 85.

The conveying section 73 includes a guide rail 102 which is fixed to a column 101 provided on the supporting substrate 78, an arm 103 whose longitudinal directional portion is supported by and which is driven in a horizontal direction shown by an arrow t in FIGS. 8 and 9 along the guide rail, and an absorption attaching potion 104 which is fixed to the other end of the longitudinal directional portion of the arm 103.

The conveying section 73 is fixedly positioned at a position where a central axis in a vertical direction of the absorption attaching section 104 is coincide with that in a longitudinal direction of the cutter 93 at the cutting portion 72. In the conveying section 73, the arm 103 is driven in a direction indicated by an arrow t in FIGS. 8 and 9 along the guide rail 102. In the conveying section 73, the arm 103 is driven until a central axle in a vertical direction of the absorption attaching portion 104 horizontally moved according to drive of the arm 103 arrives at a substantially central portion of a mounting portion 105. In the conveying section 73, the piece of hologram recording medium MD which have been absorbed by the arm 103 is mounted on the mounting portion 105 by releasing absorption power owing to a absorption attaching potion 104. Then, in the print producing apparatus 70, as below-mentioned, a single on a sheet of plastic film PF folded in two on the mounting portion 105 with the film retaining and supplying section 74, while the conveyingconveying section 73 is driven thereby conveying the piece of hologram recording medium MD onto the mounting portion 105. Further, the mounting MT is mounted with the base retaining and supplying section 76 onto a single sheet of plastic film PF opened along the folding line by the film opening and closing section 75. As shown in FIG. 7C, the piece of hologram recording medium MD conveyed by the conveyingconveying section 73 are mounted onto the mounting MT. Then, in the conveying-conveying section 73, the arm 103 is driven in a horizontal direction along the guide rail 102 by the above-mentioned predetermined position.

The conveying section 73 like this conveys the piece of hologram recording medium MD absorbed by the absorption attaching portion 104 under control of control section (not shown) to the mounting portion 105. The conveying section 73 repeats such activation by each time the piece of recording medium designed for MD are cut out by the cutting out section 72.

The retaining film retaining and supplying section 74 retains plural sheets of plastic film PF. Then, the film retaining and supplying section 74 retains plural sheets of plastic film PF in a status where a single sheet of plastic film PF becomes the half size. The film retaining and supplying section 74 mounts the absorbed single sheet of plastic film PF onto the mounting portion 105 and drives the absorbed single sheet thereof by the initial position. The film retaining and supplying section 74 only a single sheet from among the retained sheets of plastic film PF under control of control section, corresponding to that a piece of hologram recording medium MD by the cutting out section 72 to move this single sheet of plastic film PF which is absorbed onto the mounting portion 105.

The film retaining and supplying section 74 like this repeats operation for one by one supplying a sheet of plastic film PF by each of sheets retained onto the mounting portion 105, by each time when the pieces of the recording medium MD are cut out by the cutting out section 72 under control of a controlling section.

When a single sheet of the film retaining and supplying section 74 is mounted on the mounting section 105 in a status where a single sheet of plastic film PF is folded in two, the film opening and closing section 75 opens this sheet of plastic film PF along the folding line under control of a controlling section (not shown in the figures). More specifically, as shown in FIG. 8, the film opening and closing section 75 retains an end portion opposite to the folding line of a lop surface side of the plastic film PF which is folded in two and lifts up the end portion upward thereby opening the plastic film PF along the folding line. Then, when the mounting MT and the pieces of the hologram recording medium MD conveyed by The conveyingconveying section 73 are mounted on the opened plastic film PF, the film opening and closing section 75 lets the end portion of plastic film PF down in a status where the film opening and retaining section 75 folds the plastic film PF along the folding line into the original status so that the plastic film Pf sandwiches the mounting MT and the pieces of hologram recording medium MD.

The film opening and closing section 75 like this repeats operation for opening and folding the plastic film PF by each time when the plastic film PF is mounted on the mounting portion 105, under control of a controlling section.

The mounting retaining and supplying section 76 retains plural sheets of mounting MT. When the plastic film PF mounted on the mounting portion 105 is opened by the film opening and closing section 75, the mounting retaining and supplying section 76 takes out only a retained single sheet of the mounting MT which has been absorbed from among holed mountings MT under control of a controlling section (not shown in the figures). The section 76 moves the single sheet thereof onto the mounting section 105 in a state where this single sheet of mounting MT is on. Then, the mounting retaining and supplying section 76 mounts the absorbed single sheet of mounting MT onto the mounting portion 105 and thereafter move the absorbed sheet thereof to the initial position.

The base retaining and supplying section 76 like this repeatedly provides the retained mountings one by one to the mounting portion 105 by each time when the plastic film PF mounted on the mounting portion 105 is opened by the film opening and closing section 75 under a controlling section (not shown in the figures).

A laminating section 77 includes: pressure-bonding rollers 112 and 113 which pressure-bonds a bulk made by overlapping the pieces of hologram recording medium MD and the mounting MT between the plastic film PF folded in two; a conveying base 114 for conveying a bulk made by overlapping the pieces of hologram recording medium MD and the mounting MT between the plastic film PF folded in two which has been pressure-bonded by the pressure-bonding rollers 112 and 113; and beating rollers 115 and 116 which heat and pressure-bonds a bulk made by overlapping the pieces of recording medium MD and the mounting MT between the plastic film PF folded in two having a heater inside thereof.

In the laminating section 77, the bulk is conveyed, which is made by overlapping the pieces of hologram recording medium MD and the mounting MT sandwiched between the plastic film PF folded in two is conveyed from the mounting portion 105 toward in a direction indicated by an arrow u in FIG. 8 and FIG. 9. In the laminating section 77, the pressure-bonding roller 112 is rotatably provided in a rotational direction indicated by an arrow v in FIG. 8 on a supporting axle. And the pressure-bonding roller 113 is rotatably provided in a rotational direction indicated by an arrow w in FIG. 8 on a supporting axle. The pressure-bonding rollers 112 and 113 whose supporting axes are mutually parallel are arranged so that the pressure-bonding surface is substantially mutually touched. In the laminating section 77, when a bulk made by overlapping the pieces of hologram recording medium MD and the mounting MT is sandwiched between each of the pieces of hologram recording medium MD and the mounting MT, the pressure-bonding rollers 112 and 113 are rotated under control of a controlling section. A bulk is fed out, being made by overlapping the pieces of hologram recording medium MD and the mounting MT sandwiched between the plastic film PF folded in two is pressure-bonded. The bulk is fed out toward a direction indicated by an arrow x in FIGS. 8 and 9 to be provided to the heat rollers 115 and 116.

In the laminating section 77, the heating roller 115 is rotatably fixed to a supporting axle in a rotating direction indicated by an arrow y in FIG. 8 and the heating roller 116 is rotatably fixed to a supporting axle in a rotating direction indicated by an arrow z therein. The heating rollers 115 and 116 are arranged, whose supporting axes are made to be mutually parallel and whose pressure-bonded surfaces are substantially abutted. In the laminating section 77, a bulk is conveyed which is made by overlapping the pieces of hologram recording medium MD and the mounting MT sandwiched between plastic film folded in two. Thereafter, under control of a controlling section (not shown in the figures), the heat rollers 115 and 116 are rotated and the bulk is heated and pressure-bonded, which is made by overlapping the pieces of hologram recording medium MD and the mounting MT sandwiched between plastic film folded in two, resulting in producing a laminated image card IC. In the laminating section 77, the produced image card IC is fed out in a direction indicated by an arrow x in FIGS. 8 and 9 by drive of rotation of the heat rollers 115 and 116 to be exhausted from the exhaustion section 117 lo outside.

The laminating section 77 like this laminates the pieces of hologram recording medium MD and the mounting MT with the plastic film PF to produce the image card IC to discharge the image card IC for outside, by each time when a bulk made by overlapping the pieces of hologram recording medium MD and the mounting MT between the plastic film PF folded in two to produce the image card IC to exhaust the image card IC for outside, under control of a controlling section (not shown in the figures).

The print producing apparatus 70 like this cuts out the hologram recording medium 3 which is intermittently fed by the recording medium conveying section 71 by each of holographic stereogram images HS with the cutting out-section 72 to laminate each of the obtained piece of recording medium designed for MD by the laminating section 77 to exhaust the laminated one as the image card IC.

As mentioned above, the print producing apparatus 70 intermittently feeds the hologram recording medium 3 by the recording medium conveying section 71 so that a position where the pieces of hologram recording medium MD are cut out from the hologram recording medium 3 by the cutting out section 72 corresponds to the opening position 85 opened at the supporting substrate 78. Here, when each of plural holographic stereogram images HS is exposed and recorded at an equal interval distance, the print producing apparatus 70 may intermittently move the recording medium conveying section 71 corresponded to this distance. However, ordinarily, there is no guarantee that each of plural holographic stereogram images HS might be positioned and recorded at an equal interval distance onto the hologram recording medium 3. Therefore, any orientation for deciding a position where the pieces of hologram recording medium MD which is to be cut out has to be provided to The print producing apparatus 70.

Then, a first method of the print producing system 100 reads out a diffraction image from the hologram recording medium 3 by the print producing apparatus 70, thereby detecting a position in which the holographic stereogram image HS is exposed and recorded to detect a position where the pieces of the hologram recording medium MD are cut out.

More specifically, the print producing apparatus 70 includes a light source which illuminates the hologram recording medium 3 capable of being viewed from the opening portion 85 from a predetermined position as a positioning section for deciding a position where the pieces of hologram recording medium MD is cut out and e.g. a imaging device such as a CCD camera. The print producing apparatus 70 reproduces diffraction image of the holographic stereogram image HS by with illumination light from the light source as the above-mentioned reference light, and reads out an edge portion of this diffraction image by the imaging section. Thereby, the apparatus 70 detects that the holographic stereogram image HS is exposed and recorded onto the hologram recording medium 3 capable of being viewed from the opening portion 85. In addition, the print producing apparatus 70 detects that the holographic stereogram image HS is exposed and recorded. Thereafter, the print producing apparatus 70 stops drive of the recording medium conveying section 71 and activates drive of the cutting out section 72 to cut out the recoding medium designed for hologram 3 into a piece of the hologram recording medium MD.

In this way, the print producing system 100 reads out an edge portion of diffraction image from the hologram recording medium 3, thereby being capable of both controlling intermittent conveying operation of the recording medium 3 and high accurately positioning a portion where the pieces of the hologram recording medium MD are cut out.

By the way, in this first method, it is necessary that an edge potion of the holographic stereogram image HS is bright, which is exposed and recorded onto, the hologram recording medium 3. Namely, it becomes difficult to detect the edge portion, when an edge portion is dark, of diffraction image from the hologram recording medium 3.

Therefore, as a second method, the print producing system 100 exposes and records line-shaped or dot-shaped identification image forward or backward to each of holographic stereogram images HS with relative to in a longitudinal direction of the hologram recording medium 3, when the holographic stereogram images HS are exposed and recorded onto the hologram recording medium 3 by the holographic stereogram producing apparatus 10. Diffraction image of identification image is read out by the print producing apparatus 70 in a same manner as the first method. Thereby, a position where the holographic stereogram images HS are exposed and recorded is detected and a cut out position of the pieces of hologram recording medium MD is determined.

More specifically, as shown in FIG. 10A, the holographic stereogram producing apparatus 10 sequentially exposes and records plural holographic stereogram images denoted by HSn, HSn+1, HSn+2, . . . onto the elongated hologram recording medium 3. In addition, as shown in FIG. 10B indentification lines denoted by DLn, DLn+1, DLn+2, DLn+3, . . . are sequentially exposed and recorded between the holographic stereogram images denoted by HSn, HSn+1, HSn+2, . . . onto the hologram recording medium 3. Further, identification dots denoted by DDn DDn+1, DDn+2, DDn+3, . . . as identification images are exposed and recorded between the holographic stereogram images denoted by HSn, HSn+1, HSn+2, . . . .

On the other hand, although not shown, the print producing apparatus 70 includes a light source for illuminating the pieces of the hologram recording medium 3, each which is viewed from the opening portion 85 and an imaging section such as a CCD camera, which serve as a positioning section for deciding a position where the pieces of the hologram recording medium MD are cut out as above-mentioned. Diffraction image of identification line DL or identification dot DD used for identification image is reproduced by with an illuminating light from the light source section as the above-mentioned reference light. This diffraction image is read out by the imaging section. Thereby, the print producing apparatus 70 detects that the holographic stereogram HS has been exposed and recorded onto the piece of the hologram recording medium 3 that is viewed from the opening portion 85. Thereafter, when the print producing apparatus 70 detects that the holographic stereogram image HS is exposed and recorded, drive of the recording medium conveying section 71 is slopped and drive of the cutting out-section 72 is activated thereby cutting out the exposed and recorded holographic stereogram image HS as a piece of hologram recording medium MD under control of a control section (not shown in the figures).

Thus, the print producing system 100 exposes and records the identification image onto the hologram recording medium 3 by the holographic stereogram producing apparatus 10. The system 100 reads out diffraction image of identification image from the hologram recording medium 3 by the print producing apparatus 70. Thereby, the system 100 controls intermittent conveying operation of the hologram recording medium 3, resulting in being capable of high accurately deciding a position where the pieces of hologram recording medium MD are cut out, even when an edge portion of the holographic stereogram images HS is dark.

As above-mentioned, the print producing system 100 indicated as an aspect of preferred embodiment of the present invention can high accurately cut out a strip-like hologram recording medium 3 in which plural holographic stereogram images HS are sequentially exposed and recorded by a predetermined size by each of the holographic stereogram images HS, efficiently heat and pressure-bond plastic film PF at both side surfaces, and laminate each of the plural holographic stereogram images HS with the film PF, resulting in being capable of producing the laminated image as a single image card IC. Thereby, wastage of non-exposed portion in the recording medium 3 designed for hologram can be cancelled and the image card IC as a print can be more efficiently produced.

Such an image card IC will provide more entertainment to a user as an application to which a holographic stereogram is applied. Further, the image card IC can be applied with the back side surface with an adhesive layer. Thereby, the image card IC may be provided as an image seal in which the holographic stereogram images HS are exposed and recorded. Such an image seal can be produced by attaching one side surface of an adhesive double-coated tape to the back surface of the image card IC.

Further, the print producing system 100 can use a film to which an adhesive layer is applied beforehand and to which a peeling mounting (paper) or a peeling film is attached onto a surface opposite to the surface for protecting an observing surface in which the holographic stereogram image HS is exposed and recorded. In such a case, the print producing system 100 can produce an image seal in place of the image card IC. Of course, in the case, needless to say, an adhesive layer which is previously applied onto a plastic film PF is durable for heating and bond-pressure, when the holographic stereogram image HS is sandwiched by folding the plastic film PF along the folding line.

Furthermore, the present invention is not limited to the above-mentioned preferred embodiment. In the above-mentioned preferred embodiment, it has been explained that the pieces of the hologram recording medium MD are overlapped over the mounting MT provided by the mounting retaining and supplying section 76 and the overlapped bulk is laminated by heating and pressure-bonding plastic film PF. However, for example, the print producing apparatus 70 may not be provided with the mounting retaining and supplying section 76, but may produce an image card IC by at least laminating the pieces of the recording medium MD with plastic film PF by heating and pressure-bonding.

Here, the holographic stereogram image HS is often based on a personalized information such as the above-mentioned imaging data D1 and computer image D2. Then, the construction can be maintained by a mounting MT on which there is no personalized information such as a picture-pattern or a logo etc. Further, as a function of the mounting MT, originally, an image card IC having a larger size than the piece of hologram recording medium MD can be realized and an image card IC is made having rigidity or the like.

In addition, as above-mentioned, the hologram recording medium 3 has a three-layer construction formed by the film base 4, the photopolymer layer 5, and the cover sheet layer 6. Therefore, in the hologram recording medium 3, the photopolymer layer 5 may be peeled from the film base 4 and/or the cover sheet layer 6. Accordingly, by laminating plastic film PF onto both side surfaces of the piece of the hologram recording medium 3, i.e., the piece of the hologram recording medium MD, an effect can be obtained of not only protecting both of the side surfaces but also avoiding peeling. Further, in other words, even an image card IC produced by laminating at least the piece of hologram recording medium MD with plastic film PF without sandwiching the mounting MT thereto still has value as an application to which a holographic stereogram is applied as well as the image card IC produced by overlapping the pieces of hologram recording medium MD and the mounting MT and laminating them with plastic film PF.

Here, the print producing apparatus 70 may be provided with no mounting retaining and supplying section 76. The apparatus 70 convey the piece of the cut out pieces of hologram recording medium MD cut out by the cutting out section 72 onto the plastic film PF that is opened, closed and mounted onto the mounting section 105 by conveying section 73 to heat and pressure-bond the piece MD to laminate it.

Further, the present invention can be applied to not only a holographic stereogram but also a hologram. Namely, in the above-mentioned preferred embodiment, it has been explained that the holographic stereogram producing apparatus 10 produces a holographic stereogram and the print producing apparatus 70 produces the holographic stereogram image HS as the image card IC. The present invention can be readily applied to a case in which a hologram image is produced as the image card IC by the print producing apparatus 70 after producing hologram.

Furthermore, in the above-mentioned preferred embodiment, it has been explained that the print producing apparatus 70 is constituted as a single unit. However, for example, the recording medium conveying section and the cutting out section 72, and if necessary the conveying section 73, which corresponds to the former half section of the processing, may be provided as a single image cutting out apparatus. Further, The film retaining and supplying section 74, the film opening and closing section 75, the mounting retaining and supplying section 76, the laminating section 77, and if necessary, the transferring section 73, which corresponds to the latter half section of the processing, may be provided as the other single laminating apparatus.

In addition, in the above-mentioned preferred embodiment, it has been explained that the holographic stereogram producing apparatus 10, the fixation precessing apparatus 70, and the print producing apparatus 70 are separately arranged. However, these aparatuses may be constructed as a single unit.

Although the invention has been described in its preferred form with a certain degree of particularity, obviously many changes, variations and combinations are possible therein. It is therefore to be understood that any modifications will be practiced otherwise than as specifically described herein without departing from the scope of the present invention.

For example, although the protecting film was described in the preferred embodiments of the invention with reference to a plastic film, any other material can be applied so as to function as a lamination, that is, protection of the holographic stereogram or hologram against external agents such as scratches, bending, water or the like. The same can be applied to the mounting/base/support, which in the present preferred embodiment is made of paper. It is possible, however, to apply other kinds of paper or other materials as a mounting/base/support.

The invention claimed is:

1. A laminating apparatus for laminating with protecting film a hologram recording medium on which a holographic image is exposed and recorded, the apparatus comprising:
   a film retaining and supplying section for retaining a plurality of folded pieces of said protecting film, wherein each piece of said protecting film is folded in half along a fold line
   and for supplying one by one said plurality of pieces of said folded protecting film retained by said film retaining and supplying section, each piece being folded in half;
   a film opening and closing section for opening a single folded piece of said protecting film at an edge opposite said fold line; and
   a mounting section for mounting a piece of the hologram recording medium in the opened folded piece of protecting film and thereafter said film opening and closing section closes said opened folded piece of protecting film; and
   heat and pressure-bonding rollers for heating and pressure-bonding said folded piece of protecting film having been closed by said film opening and closing section, wherein said hologram recording medium is sandwiched by said protecting film.

2. The laminating apparatus according to claim 1, further comprising:
   a mounting retaining and supplying section for retaining a plurality of mounting sheets and
   for supplying one by one said plurality of mounting sheets retained by said mounting retaining and supplying section onto said single folded piece of protecting film having been opened by said film opening and closing section, wherein
   said heating and pressure-bonding rollers heat and pressure-bond said folded piece of protecting film folded along said fold line and said hologram recording medium sandwiched by said protecting film.

3. The laminating apparatus according to claim 2, further comprising:
    a conveying section for transferring a piece of said hologram recording medium to said mounting sheet provided by said mounting retaining and supplying section onto a sheet of said protecting film opened along said fold line by said film opening and closing section.

* * * * *

UNITED STATES PATENT AND TRADEMARK OFFICE
CERTIFICATE OF CORRECTION

PATENT NO. : 7,013,942 B2
APPLICATION NO. : 10/824166
DATED : March 21, 2006
INVENTOR(S) : Akira Shirakura and Hirotsugu Suzuki It is certified that error appears in the above-identified patent and that said Letters Patent is hereby corrected as shown below:

Title page,
Item [75], under Inventors, "Hirotsuga" should read --Hirotsugu--.

Signed and Sealed this

Eleventh Day of July, 2006

JON W. DUDAS
*Director of the United States Patent and Trademark Office*